US009721239B1

(12) United States Patent
Ho

(10) Patent No.: US 9,721,239 B1
(45) Date of Patent: Aug. 1, 2017

(54) CONTENT ACCESS MANAGEMENT IN A SOCIAL NETWORK USING PERMISSION-VALUE AVATARS

(71) Applicant: Oppa Inc., New York, NY (US)

(72) Inventor: Ching Hung Ho, Linden, NJ (US)

(73) Assignee: Oppa Inc., Linden, NJ (US)

( * ) Notice: Subject to any disclaimer, the term of this patent is extended or adjusted under 35 U.S.C. 154(b) by 0 days.

(21) Appl. No.: 15/199,922

(22) Filed: Jun. 30, 2016

(51) Int. Cl.
| G06Q 20/10 | (2012.01) |
| H04L 29/08 | (2006.01) |
| H04N 7/15 | (2006.01) |
| G06Q 50/00 | (2012.01) |

(52) U.S. Cl.
CPC ......... *G06Q 20/102* (2013.01); *H04L 67/306* (2013.01); *H04N 7/155* (2013.01); *H04N 7/157* (2013.01); *G06Q 50/01* (2013.01)

(58) Field of Classification Search
CPC ....... H04L 51/04; H04L 67/306; G06Q 40/00; G06Q 40/02; G06Q 30/0277; G06Q 50/01; G06Q 20/102; G06N 7/155; H04N 7/157
See application file for complete search history.

(56) References Cited

U.S. PATENT DOCUMENTS

| 6,587,127 B1 * | 7/2003 | Leeke | G06Q 20/123 |
| | | | 715/733 |
| 8,151,199 B2 * | 4/2012 | Gerson | G06F 3/011 |
| | | | 340/524 |
| 8,255,297 B2 * | 8/2012 | Morgenstern | G06Q 30/00 |
| | | | 705/26.1 |
| 8,762,465 B2 * | 6/2014 | Kim | H04N 5/76 |
| | | | 709/204 |
| 2005/0137015 A1 * | 6/2005 | Rogers | A63F 13/12 |
| | | | 463/42 |
| 2009/0225075 A1 * | 9/2009 | Bates | G06T 17/00 |
| | | | 345/419 |

(Continued)

FOREIGN PATENT DOCUMENTS

WO  WO 2010/065909  * 6/2010  ............. G06Q 50/00

OTHER PUBLICATIONS

Mazalek et al.: Giving your self to the game: transferring a player's own movement to avatars using tangible interfaces, 2009, Association for Computing Machinery (ACM), Inc., pp. 161-168.*

(Continued)

*Primary Examiner* — Bijendra K Shrestha
(74) *Attorney, Agent, or Firm* — Marin Patents LP; Gustavo Marin

(57) ABSTRACT

A system and method for managing content between a plurality of user devices an online communication environment through the use of a permission-value avatar comprising, at least, a unit database. A social network provides the plurality of users a communication environment to connect with other user devices. Content access and engagement permissions between unconnected user devices are released upon a transfer of units associated to a permission-value avatar consisting of a thematic representation, mutual content-access permissions, and a unit amount. Through the content access management system and permission-value avatar method, user incentives are aligned through the reward of content-access permissions in exchange for social network activity and unit exchange.

16 Claims, 13 Drawing Sheets

(56) References Cited

U.S. PATENT DOCUMENTS

| | | | |
|---|---|---|---|
| 2009/0241039 A1* | 9/2009 | Estevez | G06F 3/0487 |
| | | | 715/757 |
| 2009/0259948 A1* | 10/2009 | Hamilton, II | A63F 13/73 |
| | | | 3/73 |
| 2009/0287614 A1* | 11/2009 | Amsterdam | A63F 13/12 |
| | | | 705/400 |
| 2013/0029762 A1* | 1/2013 | Klappert | A63F 13/61 |
| | | | 463/31 |
| 2013/0066908 A1* | 3/2013 | Niranjan | H04W 12/08 |
| | | | 707/770 |
| 2016/0255089 A1* | 9/2016 | Diestler | G06F 21/6236 |
| | | | 726/4 |

OTHER PUBLICATIONS

Amores et al.,: Smart Avatars: using avatars to interact with objects, 2012, ACM, pp. 1-3.*

* cited by examiner

CONTENT ACCESS MANAGEMENT IN A SOCIAL NETWORK USING PERMISSION-VALUE AVATARS

CROSS-REFERENCE TO RELATED APPLICATIONS

None.

BACKGROUND OF THE INVENTION

Field of the Art

The disclosure relates to the field of content access management, and more particularly to the field of controlling access between user devices in an online communication environment.

Discussion of the State of the Art

Current social networking environments allow a user to sign up and engage with family, friends, and mutually accepted individuals, often those with common interests or connections. The social network ecosystem may range from networks with broad scale social media functionality to specific networks focused on chat, dating, or interest-matching. Common forms of user engagement between connections within a social network include the ability to post and share text, photo, or video; the ability to construct a profile and view other profiles; engagement functionality such as the ability to like, favorite, or comment; notifications, alerts and privacy systems to manage user activity; and the ability to search, discover, or like match with individuals of interest.

Generating long-term sustainable engagement among individuals within a social network environment has remained a fundamental problem resulting in the value destruction of many social networks. The inherent value created by a social network is ultimately the result of its users engaging in quality content exchange and is sustained by the discovery of new connections and new, desirable content; as user engagement decreases, so too does this network effect and value decrease. Even amongst well-known friends within a social network, concept and user fatigue leads to a persistent and exponential decrease in user engagement over time.

Current forms of engagement among both accepted friends and unknown individuals looking to interact within the social network ecosystem are often impersonal, unsatisfactory, suffer from diminishing returns, and may be focused on validation or ego fulfillment. For example, within a broad-scale social network, a user may be overloaded with irrelevant or unwanted content and receive diminishing returns on ego-validation from additional engagement. Within a chat-focused social network, users may only engage with a core group of known friends with no incentive to interact with others. And within a dating-focused social network, users suffer from superficial matching of prospects, sex imbalance issues, and persistent rejection leading to unwanted behavior such as spam and unwanted mass messaging.

Although the defined goal of many users within a social media environment is to discover new individuals of interest, current forms of social media usually allow for engagement only among a limited set of accepted friends. Generating lasting engagement between two unconnected individuals remains a core issue. Social networks are also becoming increasingly segregated based on friend, demographic, and interest groups. Within this ecosystem, segregation outcomes are often the de-facto choice as the various roles in an individual's daily existence become lumped together into one place for family, friends, peers, colleagues all sharing one set of information. Engagement beyond this increasingly segregated environment can often be futile, leading users to seek multiple social networks each for a specific purpose, segment content for specific friend networks, or to focus on results-driven engagement.

There remains a fundamental need for a method to stimulate and reward meaningful user engagement across the entire social network ecosystem over the long term. Engagement levels within the ecosystem are negatively impacted by user and concept novelty fatigue and maintaining organic and sustainable daily engagement levels remains highly challenging. Better methods for determining acceptable connections and maintaining engagement levels are needed for both existing friends and unknown individuals or entities of interest, and for establishing affirmative and lasting connections on specific social networks such as those results-driven on networking, interest-matching and dating.

Furthermore, activity within social networks are increasingly prioritized by paid advertising and commercial interests. Users accept this form of advertising as an annoyance as the vast majority of these social networks are provided at no financial cost to the user but does ask the user to commit their time for content population and engagement within the social network. User engagement is effectively purchased by commercial interests, further contributing to user fatigue and decreased engagement levels as relevant, wanted content must compete with prioritized and undesirable commercial content.

Furthermore, as memberships within social network become more global and span the globe, a thematic based communication mechanism would provide a common easily understandable graphic communication medium providing a useful, consistent representation of organic value across different languages, that may surpass cultural and communication barriers with universally recognizable schemas. Additionally, by providing a user with a reward-based and incentive-aligned methodology to select between wanted and unwanted content over the intrusion of forced commercial content, it would allow social networks to establish and maintain a business model while also encouraging organic and sustainable user engagement over the longer term.

SUMMARY OF THE INVENTION

Accordingly, the inventor has conceived and reduced to practice, in a preferred embodiment of the invention, a system and method to provide users within a social network environment a thematic-based content-access management system to create value from their own user generated content and establish affirmative content access connections using an electronic permission-value avatar method and unit database. The permission-value avatar has three components: it is represented as an easily recognizable thematic element, is tied to mutual content-share permissions, and has an associated unit value. Upon one user electing to send or share such a permission-value avatar with another user, an affirmative connection is established with engagement and content permissions mutually released. Concurrent with the mutual access of content permissions, the units assigned to the permission-value avatar is transferred from the user to the chosen recipient.

According to an embodiments of the present invention, a social network environment is provided whereby a user may post and share text, photo, and video; construct a profile and view other profiles; engage with other users such as the ability to like, favorite, comment, and chat; have access to notifications, alerts and privacy systems to manage user activity; engage in group communications and game functionality; reach achievement benchmarks; and have the ability to search, discover, or like match with individuals and commercial entities of interest. The social network will limit access to aforementioned content and engagement between unconnected users.

According to the embodiments of the present invention, users may share or send permission-value avatar units with different thematic representations to recipient users of interest, each permission-value avatar tied to mutual content-access permissions and having assigned or adjustable units. Such thematic representations may be item-based, such as a "drink" or "unicorn", action-based such as "wink" or "punch", or cultural representations such as "Martha Washington" or "Sashimi the Cat." As the permission-value avatars each have an associated unit component, an exemplary "Drink" avatar may have an associated unit amount of 1.

Thematic based permission-value avatars provide a useful, consistent representation of organic value across different languages, surpasses cultural and communication barriers with universally recognizable schemas, and provides a unique exchange mechanism across differing international representations. For example, in an embodiment where the units may be proportional to a standard medium of exchange whereby the unit value component of permission-value avatars are a unit value, for example, one "wink" can be equivalent to one unit, creating a 1:1. It should be appreciated that an oppa unit may be a virtual unregulated medium of exchange which is issued and controlled by the content access management system, and used and accepted among the member user devices of social network system and a plurality of social network providers. In a preferred embodiment, each theme of a thematic component of a permission-value avatar is assigned a thematic identifier.

The unit component of permission-value avatars sent or shared are subtracted from a first unit database associated to a sending user device and added to a second unit database of a receiving user device. Permission-value avatars may be created, purchased, exchanged, and redeemed from and between real and virtual currency. In some embodiments, units associated to a permission-value avatar may correspond to a unit value which may be based on the real and virtual currency from which they may be created from and social network users may also redeem permission-value avatar units for real or virtual goods and services or withdraw them as real currency. Through this method, users within a social network are provided a framework to effectively add value to content, engagement, and activity within a social network.

According to an embodiment of the present invention, users within the social network system are provided with an electronic value store medium as a store of real, virtual, or avatar based value in the form of a units storage medium in a unit database. The unit database may be associated to a graphical element thematic-based, for example, in the shape of an animal such as a pig. Users may add, withdraw, exchange, or convert units in their unit database and redeem their unit database for cash, goods, services, other forms of stored value, charitable donations, and the like. Permission-value avatars stored in the unit database may be used within the social network environment, for example, as content-access tokens but may also provide an effective and accessible storage vessel associated to exchange value between a plurality of users in a communication environment.

According to an embodiments of the present invention, a transfer of a permission-value avatar provides a useful method to sustain and reward user engagement in the long-term. Electing to transfer a permission-value avatar will establish an affirmative connection between the sender and the recipient, removing content and engagement-based restrictions among otherwise default-state unconnected users. Engagement and mutual content-access permissions, such as the ability to communicate, view and interact with content such as posts, photos and videos, play a reward-based game, engage in group features such as joining an online group or group chat, and otherwise provide less restrictive or unrestricted access to one another's content and engagement within the social network become mutually available or less restricted between users upon transfer of this permission-value avatar.

According to an embodiments of the present invention, by sending a permission-value avatar, the sending user device may be allowed preferential access and a removal of restrictions to the content of the receiving user device. Such permission-value avatars create a reward framework for an incentive-based marketplace beneficial to the user in deciding whether or not to establish an affirmative connection with another user device and also in the level of progressive engagement desired with a target user device. The ability to designate desirable recipients within the social network, levels of content access, and levels of reward can be adjustable to fit the intentions of the sender. In one example, a user device can send a permission-value avatar with a larger assigned unit value or consecutive permission-value avatars to a user device with continual high engagement value. In another example, user devices can remain actively engaged with both existing connections and connect to new user devices by playing an online game with the option to wager a permission-value avatar between winner and loser of such game.

According to some embodiments of the present invention, user devices may send or share permission-value avatars to more than one recipient use devices either individually or concurrently to allow mutual shared content permissions and remove engagement restrictions between multiple recipient user devices of designated preference. In one example, interest-based users of social networks can share permission-value avatars via user devices to join an interest group, or use or pool them to create a minimal barrier of entry in establishing a high-engagement group of user devices. In another example, users seeking friendship can share permission-value avatars via user devices to create a group event or online party and invite multiple recipient user devices of designated preference to join, allowing for shared content based on the permission component of the permission-value avatar after the transfer of one or more permission-value avatar among a plurality of user devices. According to some embodiments of the present invention, each user device may be associated to one or more user profiles whereby the one or more user profiles are exchanging (that is, assigning) a plurality of permission-value avatars between a plurality of user profiles. In this regard, the plurality of user profiles manages, at least, statistics on, for example, the number of permission-value avatars that are held by the user profile, personal information about a user associated to the associated profile, location information about the user and the user's device, exchange rates, historical information, interests, and the like.

Similarly, commercial interests can better align their interests with users in sending permission-value avatars to engage with multiple targeted recipient user devices of designated preference. Rather than forcing consumption of paid commercial content upon the social network, commercial entities may now use a reward-based methodology. Highly engaged user devices can elect to consume commercial content in receiving the unit reward component of the permission-value avatar in exchange for the content-access permissions component of the permission-value avatar. The permission-value avatar effectively translates commercial content from a forced paid advertisement often necessary to the business model of social networks to a favorable, incentive-aligned goodwill branding format as users are provided with a unit reward component when engaging with commercial content.

These and other features of the invention will be more readily understood upon consideration of the attached drawings and of the following detailed description of those drawings and the presently-preferred and other embodiments of the invention.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
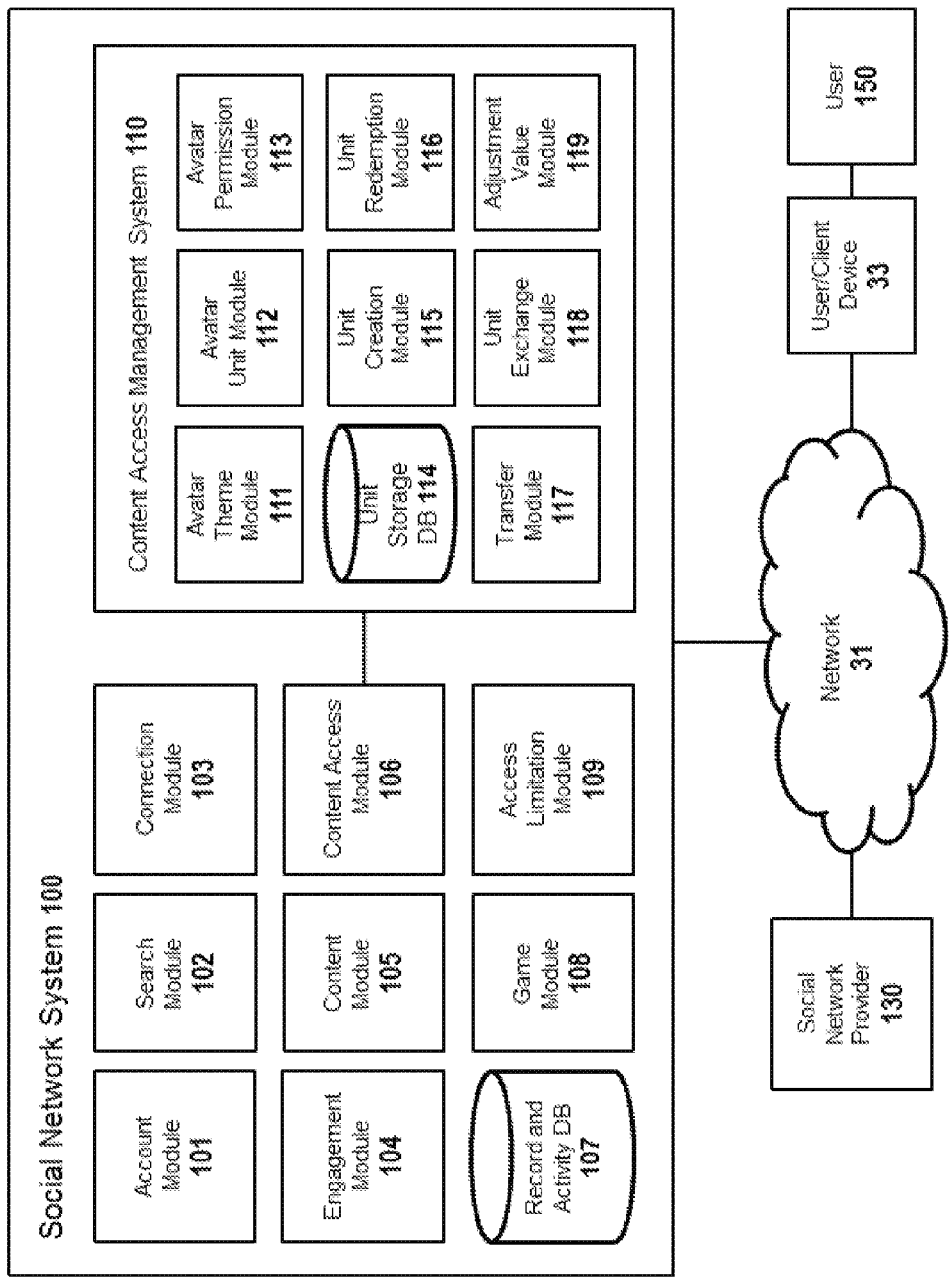
FIG. 1 is a block diagram of an exemplary system for a social networking environment and content access management environment in which various embodiments of the invention may be applied.

The inventor has conceived, and reduced to practice, a system and method enabling users to manage content and increase engagement and activity within the social network environment through the use of a permission-value avatar transfer method and a unit database. A social network provides the user an environment to connect with other users. The user (the viewing user) may choose to engage with other users (the subject user) in the social network. Content access and engagement permissions are limited by default between the unconnected viewing user and subject user in the social network. Content access and engagement permissions between the viewing user and the subject user are released or become otherwise less restricted upon a value transfer in the form of a permission-value avatar consisting of a thematic representation, mutual content-access permissions, and a unit value assigned or derived from real or virtual currency. Through this content access management system and permission-value avatar method, user incentives are aligned through the reward of the shared content-access permissions component of the avatar in exchange for the unit value component of the avatar.

Participants of the social network may include user devices, user device groups, vendor devices, and commercial entity devices. Users are individuals, via a user device, that join the social network and may purchase permission-value avatars or acquire permission-value avatars through activity within the social network. User device groups are a multitude of individuals, via user devices, forming a shared-permissions group in which content access permissions are granted within the group, or a multitude of individuals of designated preference to be the targeted recipient of permission-value avatars of a sending user, user device group, vendor device, or commercial entity device. User device groups may also be a segmented community, a separate, limited, chosen, or exclusive or semi-exclusive group within the social network wherein each segmented user device group member may access the content and engage with other members of their respective segmented user device group. Commercial entity devices can offer user devices or user device groups the permission-value avatars in exchange for the viewing or interaction with a commercial message. A vendor can provide goods and services in exchange for permission-value avatars from users, or third party entities such as electronic payment providers or mobile phone carriers which participate in transactions in the content monetization system.

The permission-value avatar method is provided that allows a user device, user device groups, or commercial entity devices to engage with subject user devices in multiple forms of the example embodiment. In an individual level embodiment, the viewing user, in an unconnected, limited access state within the social network, may transfer a permission-value avatar to the subject user in exchange for mutual chat and photo access permissions with the subject user receiving the unit value component of the permission-value avatar. In another individual level embodiment, users can play a reward-based game in which the viewing user can share a permission-value avatar with the subject user upon a win or loss condition, or to facilitate access resulting in a connected content-permissible state and to generate frequent or long-term engagement between the viewing and subject user within the social network. In an example embodiment of a user device group, a sending user may host a group event to connect with multiple users of designated preference at once or to create a minimal barrier of entry in establishing a preferential content-access private group. In an example embodiment of a commercial interest, the commercial entity may interact with users through a reward-based methodology in transferring a permission-value avatar to a group of users of designated preference to facilitate user viewing of commercial content in exchange for receiving the unit reward component of the permission-value avatar, effectively providing incentive-aligned goodwill for users to engage with the commercial content. These and other example embodiments are described in further detail herein.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions.

Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram of an exemplary system for a social networking environment and content access management environment in which various embodiments of the invention may be applied. According to the embodiment, a network-diagram of a system environment for social networking environment 100 and content access management environment 110 in which the embodiment of the invention may be applied, are disclosed. One or more users, such as user 150 through via a plurality of user/client device 33 may be members of social network provider 130 via network 31. Social network provider 130 may be any social networking service that provides user-to-user content services or communication environment, ranging from social networks with broad functionality to specific networks focused on chat, dating, or interest matching. Common forms of user engagement within social network 100 offers, at least, the ability to construct a profile and view other profiles via account module 101, search for other users via search module 102, connect with other users via connection module 103, engage with other users such as the ability to like, favorite, or comment on subject user content via engagement module 104, share content such as text, chat, photo or video via content module 105, play a game with other users via game module 108, access other user content in a connected, permissible, affirmative or delimited state via content module 106 by receiving requests from one or more user devices 33. In some embodiments, engagement access permissions may be limited between unconnected users by access limitation module 109. Records of such content and activity between users may be stored in record and activity database 107.

FIG. 1 further discloses content access management system 110 within a system environment or social network environment 100 suitable for the creation, transfer, exchange and redemption of units and permission-value avatar s. The system environment may comprise of one or more user devices 33 such as specially programmed computers and/or specially programmed user/client device 33 (for example, a network-connected mobile user device) that can receive and transmit user data and communicate between a plurality of servers within a network which may be comprised of any combination of wired or wireless communication systems within a local area or wide area network 31. Unit database 114 may be tied to a plurality of user profiles by account module 101 within the content access management system allowing for the acquisition or generation of units by unit creation module 115, the redemption of units by unit redemption module 116 (for example, in exchange for real and/or virtual goods and services) and the transfer of units and permission-value avatars by transfer module 117 between, for example, user devices, user device groups, vendor user devices, and connected commercial user devices. In some embodiments, units can be purchased through a financial instrument or generated within the social network as a reward or incentive for engagement by unit creation module 115. In some embodiments, the number of units stored in unit database 114 may be derived from and exchanged by unit exchange module 118 for real or virtual currency between user devices, user device groups, vendor user devices, and commercial user devices. In some embodiments, adjustment value module 119 may assign a value to a unit by associating a number that may be proportional or have an exchange basis relative to a value of a unit belonging to another entity (for example, a medium of exchange such as a real currency, a virtual currency, experience points in an electronic game, and the like).

According to the embodiment, content permission for a unit transfer method within the embodiment of a permission-value avatar is disclosed as having a thematic element or thematic identifier as defined by avatar theme module 111, tied to a unit value by avatar unit module 112, and mutual content share-permissions as defined by avatar permission module 113. In some embodiments, a unit may have a value that is proportional or have an exchange basis relative to a standardized medium of exchange such as a real or virtual currency. In some embodiments, upon a first user device 33 viewing a plurality of other user devices and electing to send, share, or transfer units via transfer module 117 for example, via a permission-value avatar to a target second user device 33. As such, first and second user devices 33 may go from a default content-limited unconnected state, for example, as limited by access limitation module 109 to an affirmative content-permissible connected state as configured by connection module 103 with engagement parameters configured by engagement module 104, content sharing configured by content module 105, and access permissions configured by content access module 106 for the first and second (or more) user devices 33. Concurrent with the mutual access component of content permissions as defined by avatar permission module 113, the unit value component of the permission-value avatar, as defined by avatar unit module 112, may be transferred by transfer module 117 from first user device 33 to one or more other user devices 33 (for example, one or more other chosen recipient user devices). In some embodiments, avatars or at least a portion of units stored in unit database 114, may be associated to a user devices' profile by account module 101 with associated records and activity kept in record and activity database 107.

Figure 2:
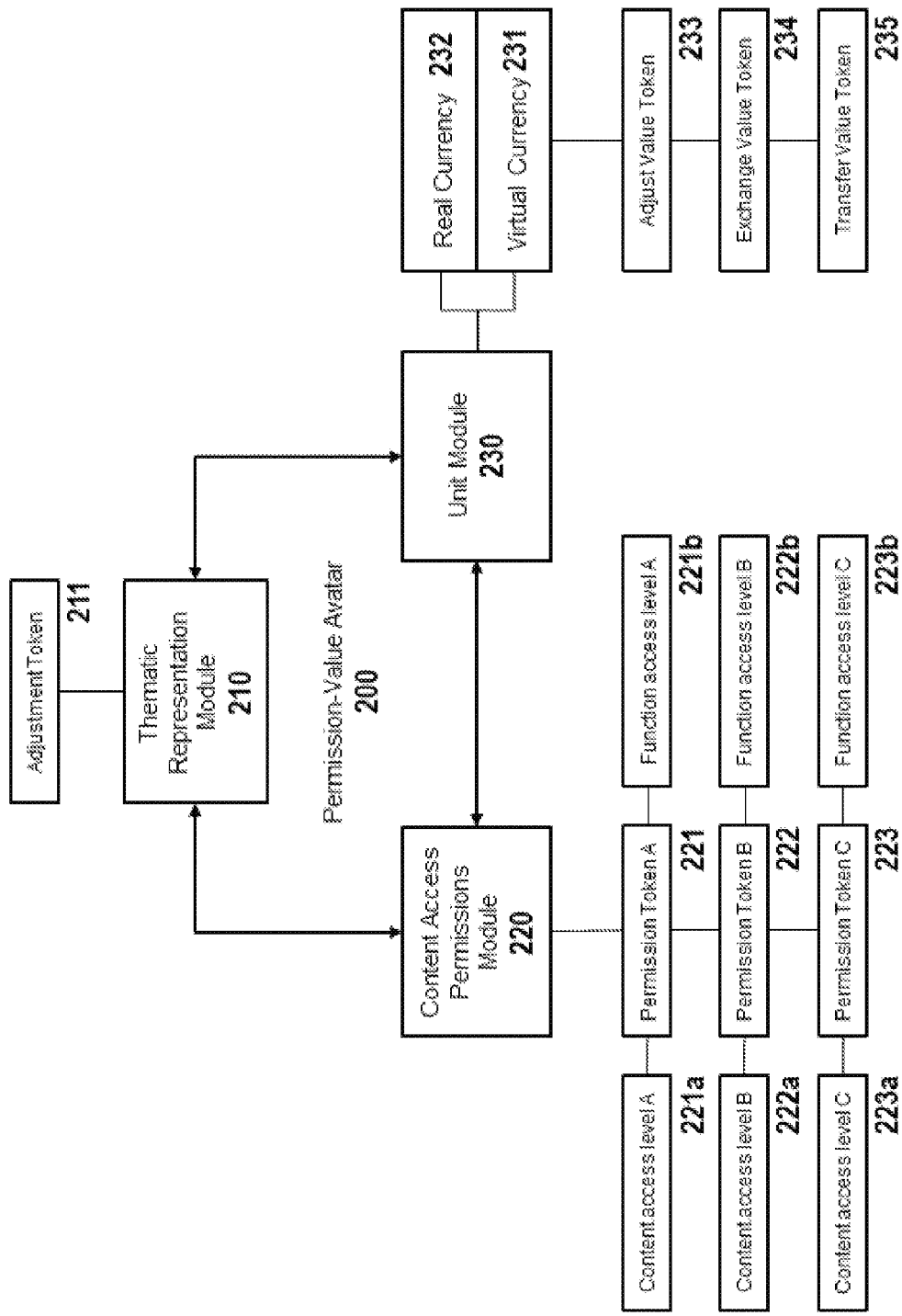
FIG. 2 is a high level conceptual diagram illustrating an avatar possessing a thematic component, a mutual content-access permissions component, and a unit component, according to a preferred embodiment of the invention.

FIG. 2 is a high level conceptual diagram illustrating a permission-value avatar possessing a thematic component, a mutual content-access permissions component, and a unit component, according to a preferred embodiment of the invention. According to the embodiment, a high level conceptual diagram illustrating a permission-value avatar 200 possessing thematic module 210, mutual content-access permissions module 220, and unit module 230 whereby units configured in unit module 230 may be proportional or have an exchange basis relative to virtual 231 or real currency 232, are disclosed. A plurality of user device 33 may share or send permission-value avatars (and associated units) with different thematic representations to one or more recipient user devices of interest, each permission-value avatar tied to mutual content-access permissions and having an assigned or adjustable unit amount or value. In some embodiments, units may be based on virtual or real currency or both. In other embodiments, units may represent value for exchanged goods and services or experience and honor points in gaming. The thematic component representations 210 of the permission-value avatar may be item-based, such as a "drink", a "ticket for an event" or "unicorn", action-based such as "wink" or "punch", or cultural representations such as "Martha Washington" or "Sashimi the Cat." As these permission-value avatars each have an associated unit amount or value, an exemplary "drink" avatar may comprise of a graphical drink icon as defined by thematic module 210 and have a unit value such as one oppa unit 231. In some embodiments, a unit value may be associated to a proportion of a standard medium of exchange, for example, one unit may be equivalent to one oppa unit or may be valued at 1 United States dollar 232, or both. In a preferred embodiment, a thematic component is assigned a thematic identifier to identify and distinguish between themes or components.

In some embodiments, first user device 33 may acquire a certain quantity of permission-value avatars 200, for example, through a financial instrument such as a credit card for a real currency price 232 or virtual currency price 231 associated to the first user device 33. According to the embodiment, the avatar itself or the thematic component of the avatar (for example, five drinks or five winks), with a unit value based on real or virtual currency, may be a unit value stored in unit database 114 associated to first user devices' 33 profile. In another embodiment, a second user device 33 may acquire a certain quantity of permission-value avatars also using, for example, real or virtual currency with the real or virtual currency itself as the transfer unit between user devices. According to the embodiment, the real or virtual currency (for example, 5 United States dollars or 5 oppa units) may be the unit value stored in unit database 114 and associated to a user profile corresponding to second user device 33.

In some embodiments, thematic based permission-value avatars, via user devices 33, provide a consistent representation of organic value translatable across languages, cultural, and communication barriers. In one embodiment, a drink avatar may allow user devices from one language to communicate with user devices of another language. In some embodiments, transferring units between a plurality of user device profiles (each associated to a user device 33) wherein units may be, for example, proportional and associated to one national currency to user profiles associated to, for example, a differing national currency within the social network system 100, or connected via social network provider 130. According to the embodiment, user devices may acquire avatars associated to units having a different proportional to a differing national currency 232, for example, as determined or preconfigured within unit exchange module 118 or, for example, as adjusted by adjustable value module 119. In this regard, a plurality of users 150, via a plurality of user devices 33, may use permission-value avatars as a means to communicate or transfer value across physical, language and cultural barriers. According to the embodiment, first user device 33 associated to a user within, for example, the United States may, for example, send a one oppa unit drink themed permission-value avatar acquired by first user device 33 (i.e. sending user) for one unit (for example, wherein the one unit is representative of 1 United States dollar 232 as configured by unit exchange module 118) to, for example, a second user device 33 associated to a Chinese user (i.e. receiving user) whereby the one oppa unit drink 231 define a sample exchange rate of six Chinese yuan 232. It can be appreciated by one with ordinary skill in the art that such a method allows the universally recognizable schematic representations 210 of the permission-value avatar 200 to provide a useful and consistent exchange across differing valuation systems and alternative electronic-based and virtual currencies based on changing conditions in the real-world or within system 100, or both. In other embodiments, one "wink" avatar 200 may acquire the same content-permission release parameters between a plurality of user devices 33 of a social network seeking mutual connection, although such avatars may be acquired by, for example, separate national currencies 232 associated to the units, adjustment value module may create a 1:1 ratio or other adjustable exchange ratio between virtual or alternative currencies 231, or both.

Detailed Description of Exemplary Embodiments

Figure 3:
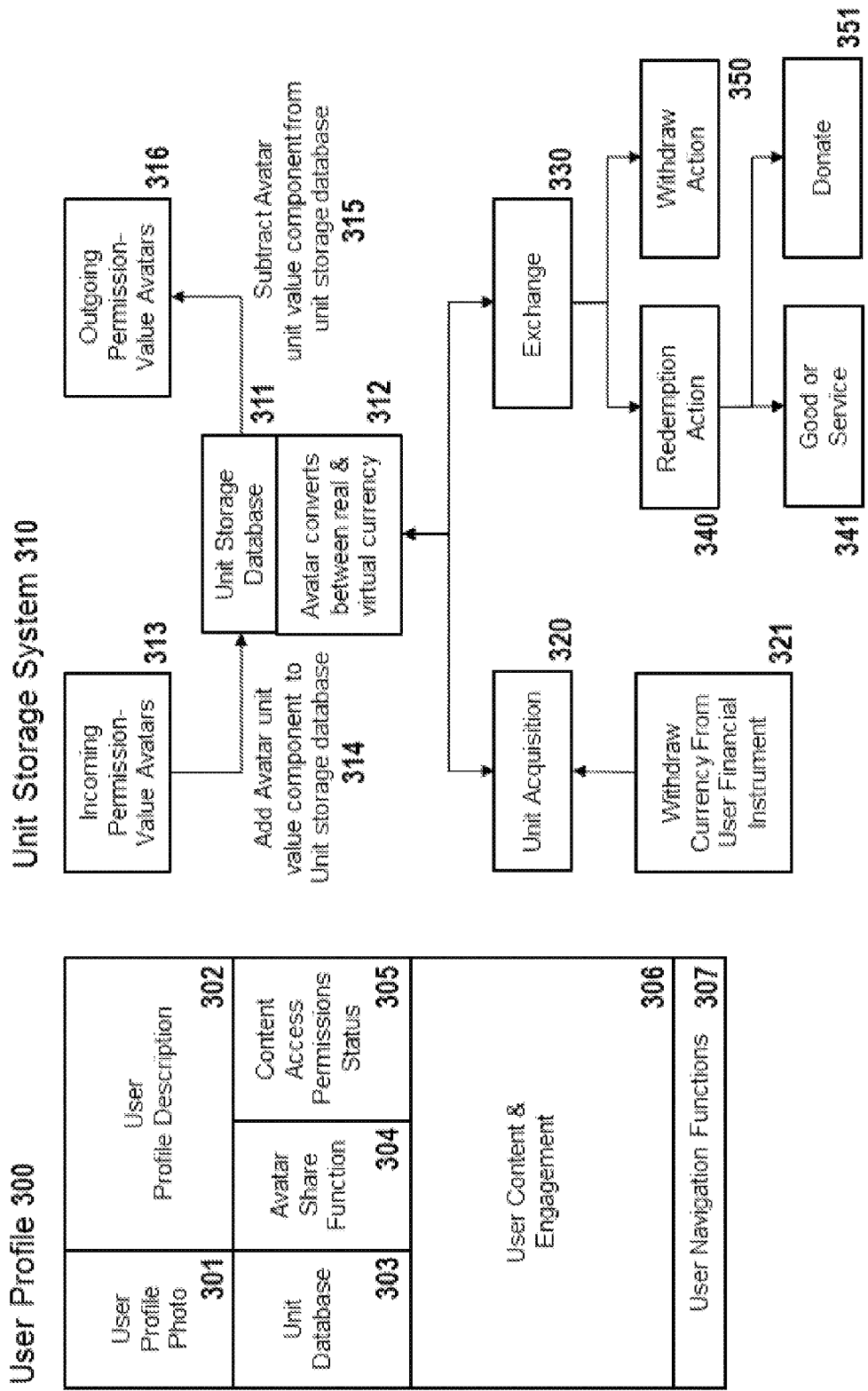
FIG. 3 is an exemplary embodiment illustrating a unit database of a permissions-value avatar, according to a preferred embodiment of the invention.

Referring now to FIG. 3. FIG. 3 is an exemplary embodiment illustrating a unit database of a permissions-value avatar, according to a preferred embodiment of the invention. According to the embodiment, a unit storage system 310 and a unit management environment within the social network in which a unit value component of a permissions-value avatar is created, transferred, exchanged, and redeemed is disclosed. A user profile system 300 is provided to organize user content and to provide an environment for engagement between a plurality of user devices 33 within a social network. According to the embodiment, user profile system 300 comprises, at least, user profile photo 301, user profile description 302, unit database 303, an avatar share function 304 allowing the transfer of a permission-value avatar from viewing associated user device profiles, content 306 associated to a particular user device 33, and social network navigation functions 307 allowing a user device 33 to explore content and search for other user devices within the social network. In some embodiment, user profile 300 may be a commercial entity profile associated to a commercial or vendor entity device 33. Within user profile 300, a content access permissions system is provided 305 whereby, a user device 33 may, for example, select content and engagement level privacy settings and limit other user device's 33 access to, for example, personal content. In various embodiments, a user device 33 may specify, at least, for example, public versus private level permissions, user and user device connection level permissions, interaction and engagement level permissions, time-based permissions, or segment permissions based on interest, location, or relationships for the user devices' content and activity within the social network.

According to various embodiments, user profiles 300 configured within the social network system may be configured with an electronic value store medium as a store of real, virtual, or avatar-based unit value within unit storage database 311. Unit storage database 311 may comprise a thematic-based component, such in the image of an animal (for example, a pig) or some other image. User devices 33 may add, withdraw, exchange, or convert between real, virtual, or avatar based unit value in unit storage database 311 and redeem units for virtual or real items, for example, goods, services, currency, other forms of stored value, charitable donations, and the like.

The content management system allows for a user device 33 to send 316 and receive 313 permission-value avatars, with a unit value component of an associated avatar sent subtracted from a first user device 33's (i.e. the sender) unit storage database 315 and added to a second user device 33's (i.e. the recipient) unit storage database 314. The total unit value of all such avatars are aggregated in a unit storage database 311. In some embodiments, units may be acquired via engagement within the social network 320, or through an acquisition of units via a unit acquisition 320 by, for example, a transaction via a financial instrument associated to a user device 33. In a similar embodiment, as permission-value avatars may have a unit value based on, for example, a real and/or virtual currency from which they are created from, user devices 33 connected to the social network, may also exchange 330 through a redemption action 340 for real virtual goods or services 341, or, for example, donate 351 through a withdraw action 350. In another embodiment, withdraw action 350 may be to a standard medium of exchange such as United States currency. In some embodiments, content management system 110 may have restrictions on when certain actions can happen. For example, content management system may require a user profile to reach a certain minimum unit amount within unit storage 311 as a prerequisite condition before exchange 330 is available to the associated user device 33.

In a similar embodiment, a user may acquire (or exchange), for example, 30 drink avatars for 30 units. According to the embodiment, 30 units may be associated to a value determined by unit exchange module 118 at a 1:1 ratio representing a total value of 30 United States dollars whereby a financial instrument configured within a first user device 33 accesses, for example, a pre-configured credit card 321 and a corresponding amount is charged. In this regard, 30 units may be added to a unit storage database 311 whereby the units represent 30 drink avatars. In another embodiment, the user may convert, for example, 30 US dollars for 30 virtual oppa units, which may then be exchanged for a plurality of, for example, drink avatars having an assigned value of one virtual currency oppa unit. It is useful to note that in this example, the avatar may serve, in some embodiments, at least, as a graphical representation of a conversion or exchange calculation mechanism (with associated access-permissions) between real and virtual currency 312. According to the embodiment, a recipient user device 33 may, for example, exchange or redeem the units, for example, perform a redemption action 340 by exchanging the drink avatar, whether derived from real or virtual currency, for actual goods (for example, a beverage in an establishment that is a member of social network system 100, or social network provider 130) and/or other goods and 341, or exchange the Drink avatar into an corresponding amount of real US dollar currency as calculated by unit exchange module 119 through withdraw action 350.

Figure 4:
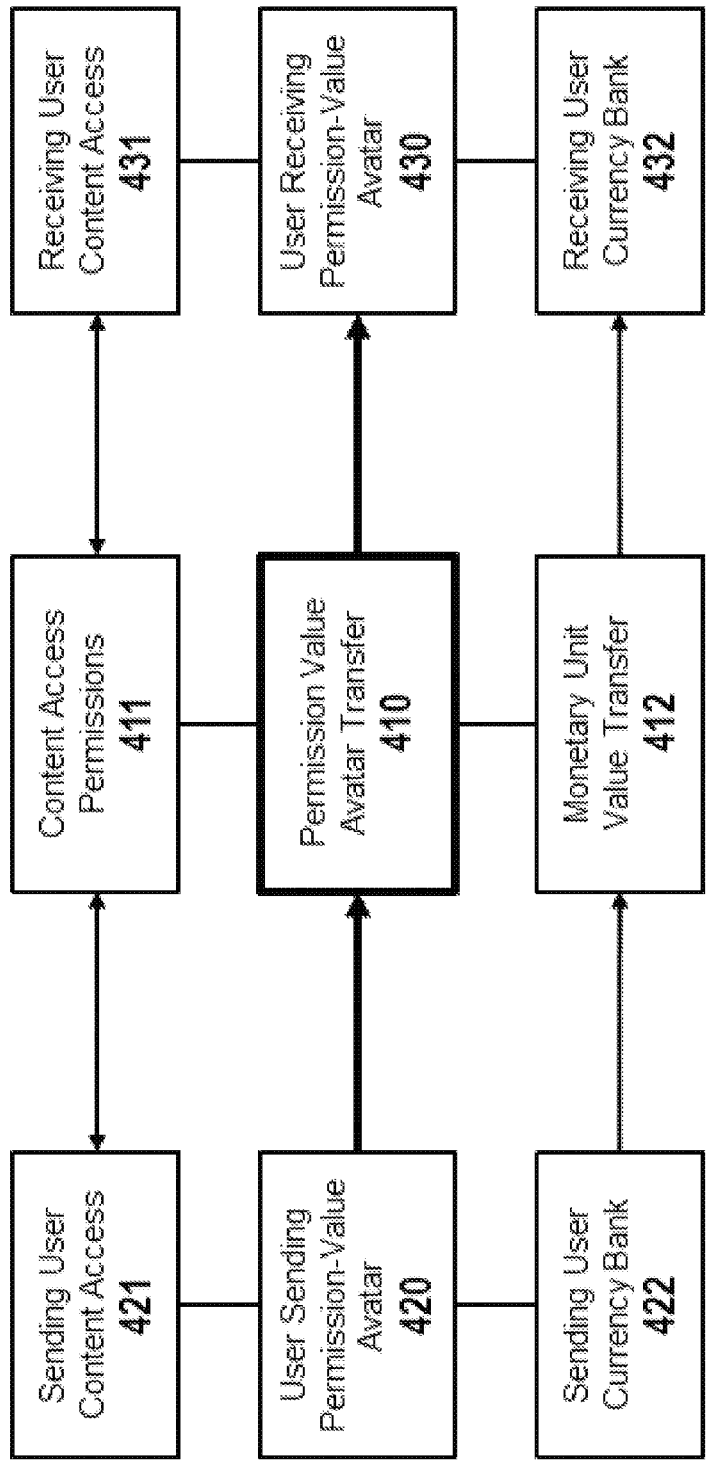
FIG. 4 is a flow diagram illustrating a unit exchange system and a content-access permissions exchange system upon the transfer of a permissions-value avatar, in accordance with a preferred embodiment of the invention.

FIG. 4 is a flow diagram illustrating a unit exchange system and a content-access permissions exchange system upon the transfer of a permissions-value avatar, in accordance with a preferred embodiment of the invention. According to the embodiment, a content access management system 110 illustrates an exchange between the unit component and the content-access permission component of a permission-value avatar upon the transfer of the permissions-value avatar is disclosed. In a first step 420, a first user device 33 (i.e. a sending user device) may elect to transfer a permission-value avatar in step 410 to a second user device 33 (a receiving user in step 430) via transfer module 117, within social network system 100. Upon a transfer (and including but not limited to acceptance by the second user device 33) of the permission-value avatar from the first user device 33 to the second user device 33, content access permissions may be set by content access module 106 in step 411, which may include a portion of a plurality of content associated to both the first user device 33 in step 421 and the second user device 33 in step 431. In this regard, at least a portion of the plurality of content corresponding to each user is made mutually available to both the first user device 33 and second user device 33. Further upon a transfer (and acceptance by the second user device 33) of the permission-value avatar from the first user device 33 to the second user device 33, the unit value component of the permission value avatar 412 would then be subtracted from a unit storage database 114 corresponding to the first user device 33 in step 422 and added to the unit storage database 114 corresponding to the second user device 33 in step 432.

In some embodiments, the receiving user may have the option to accept the avatar after such acceptance creating a content-access permissible state between the first user device 33 and the second user device 33 in step 411. Such acceptance option may have, for example, a time expiration and without the receiving user accepting the Avatar within the designated time period, the Avatar may then be returned to the first user device 33, leaving the first user device 33 and the second user device 33 in an unconnected state with limited content-access permissions as determined by access limitation module 109. Content, communication, and engagement permissions may also be limited on a single level or a multitude of levels and/or between unconnected and connected user devices in step 411. For example, permission levels may be set on multiple levels by a user device 33, such as the ability for unconnected user devices to view content designated for public consumption regardless of connection status but not, for example, certain private-level photos or time-limited content designated for connected user devices.

In some embodiments, permissions may be further segmented among affirmatively connected user devices by different user devices and user device groups, whether defined or undefined. In some embodiments, even though the transfer of a permission value avatar creates a connected status between a first user device 33 (sending user device) and a second user device 33 (receiving user device), a user device 33 may set content access permissions in step 411 for different connected user devices of designated preference, for example, creating a segmented group or subset of user profiles (each associated to a user device 33) or designating certain content for the segmented group only. In summary, in some embodiment, step 411 may configure permissions that may be partially or fully limited, gated, segmented, defined, undefined, and adjustable both between and within unconnected and connected user devices and user device groups and across a single or multiple levels of functionality provided by social network system 100.

Figure 5:
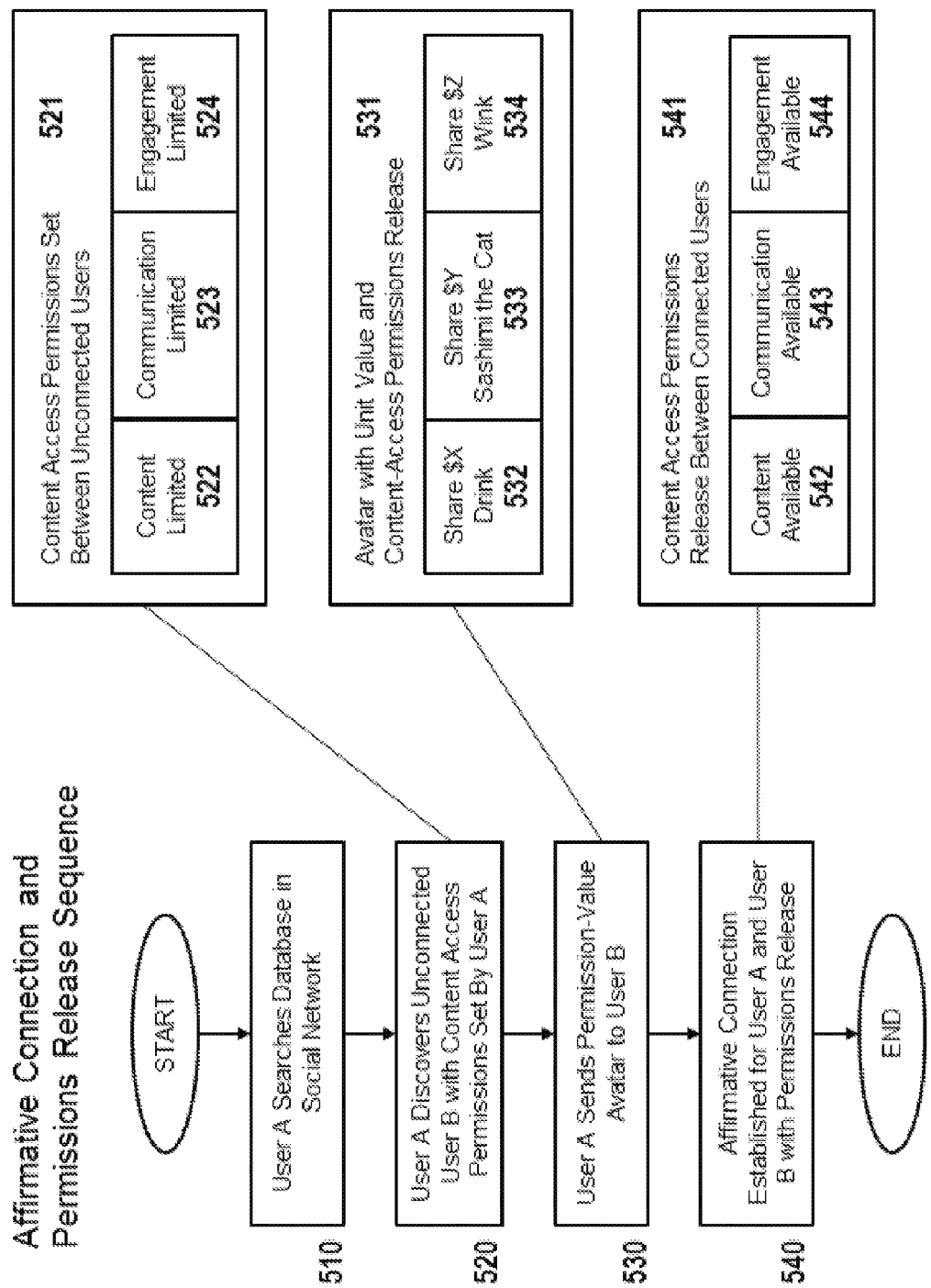
FIG. 5 is a flow diagram of an exemplary embodiment illustrating a content-restricted state between unconnected users to an affirmative connection state with content-access permissions resulting upon the transfer of a permissions-value avatar, in accordance with a preferred embodiment of the invention.

FIG. 5 is a flow diagram of an exemplary embodiment illustrating a content-restricted state between unconnected user devices 33 to an affirmative connection state with content-access permissions resulting upon the transfer of a permissions-value avatar, in accordance with a preferred embodiment of the invention. According to the embodiment, in a first step 510, a first user device 33 configured within social network system 100 may search or browse user profiles within social network system 100 and start, in step 520, in a default unconnected, content-restricted or permission-restricted state, or both, in which user devices 33 are limited in their content engagement permissions with other user devices 33. In step 521, certain levels of access restrictions may set by, for example, one or more user devices 33 of a plurality of user devices 33, a group between unconnected user devices 33 across one or multiple levels of functionality. In step 522, content limitation may include, for example, limits in accessing at least a portion of content associated to another user profile such as text posts, photos, videos and other personal information, limits configured in step 523 may include limits in communicating with other user devices 33 including but not limited to, the ability for recipient user devices to receive communications, and limits in engagement, configured in step 524, such as the ability to interact with other user devices 33 through other means such as the functionality to like, favorite, and comment. Additional permission level restrictions may include, limiting the ability to search for designated user profiles of interest across age, gender, demographic, ethnic, location, proximity and other similar factors in step 521, limiting the ability of user devices to view certain time-set content having an expiration time or date in step 522, limiting the ability of user devices to view or respond to other user devices' communications in step 523, limiting the ability of user devices to access chat groups in step 523, limiting the ability of user devices to play a game or access gated or segmented functionality within the social network such as the ability to throw a party or group event, in step 524, or functionality level limitations such as the ability to determine specific action notifications even though a targeted action towards the recipient user device 33 may have been performed by sending user device 33 and a notification generated resulting from such an action in step 524.

According to the embodiments of the present invention, in step 531, a sending user device 33 may be provided with a plurality of selectable permission-value avatars that may be sent or shared with a receiving user device 33. As the permission-value avatar has a thematic component, a unit value component (for example, derived from real, virtual or alternative value) and a content-access permissions release component, so too may the individual components have different values and adjustments. For example, thematic differentiations may be item-based, such as a "drink" or "unicorn", action-based such as "wink" or "punch", or cultural representations such as "Martha Washington" or "Sashimi the Traveling Kitten." The unit value component may be variations of real currencies (such as one United States dollar or one British pound), virtual currency (such as two oppa units), or alternative currencies (such as three bitcoins). For example, unit value in one such embodiment may be defined in virtual terms (such as one oppa unit), and a United States user device may purchase such virtual currency (for example at a rate of one United States dollar for one virtual oppa unit), send it to a receiving British user device, who may then withdraw the one oppa unit drink at a British pound market exchange value as defined by unit exchange module 118 or for sample goods and services on British pound terms. It should be appreciated that unit exchange module 118 may be connected to an external service to retrieve exchange rates or other configurations to determine exchanges. Permissions may also be set at a combination of multiple levels and values, such as on content-release level, an engagement-release level and segmented by user device or user device groups. In summary, in step 530, in some embodiments, a sending user device 33 of a permission-value avatar to a recipient user device may send an avatar with any combination or associations of the, at least, three components of the avatar in step 531, such as a 1 United States dollar drink avatar with friend permissions, a 2 oppa dollar Sashimi the Cat avatar with chat permissions, or a 3 British pound wink avatar with full permissions.

In sending a permission-value avatar to a receiving user device 33, sending user device 33 may be configured with preferential access and a removal of restrictions to the content and engagement of recipient user device 33. The act of sending a permission-value avatar establishes a connection status between first profile 300 of sending user device 33 and second profile 300 of receiving user device in step 540 with, for example, less restrictive or unrestricted access to partial or full content (as defined by step 542), communication (as defined by step 543), and engagement (as defined by step 544) permissions between sending user device 33 and receiving user device 33. In some embodiments, content and engagement permissions may be granted on a mutual basis between both sending user device 33 and recipient user device 33. Such permission-value avatars may create a reward framework for an incentive-based marketplace beneficial to a user device in deciding whether or not to establish an affirmative connection with another user device, and also in the level of progressive engagement or level of content release desired with a target user profile 300. The ability to designate desirable recipient profiles 300 within social network system 100, levels of content access, and levels of rewards can be adjustable to fit the intentions of sending user device 33. In one example, first user device 33 can send a permission-value avatar with a larger assigned number of units or consecutive permission-value avatars to second user device 33 with, for example, a continual high engagement value. In another example, a plurality of user devices 33 can remain actively engaged with both existing connections and connect with new user profiles by playing, for example, an online game with the option to, for example, wager a permission-value avatar between a winner and a loser of such game.

Figure 6:
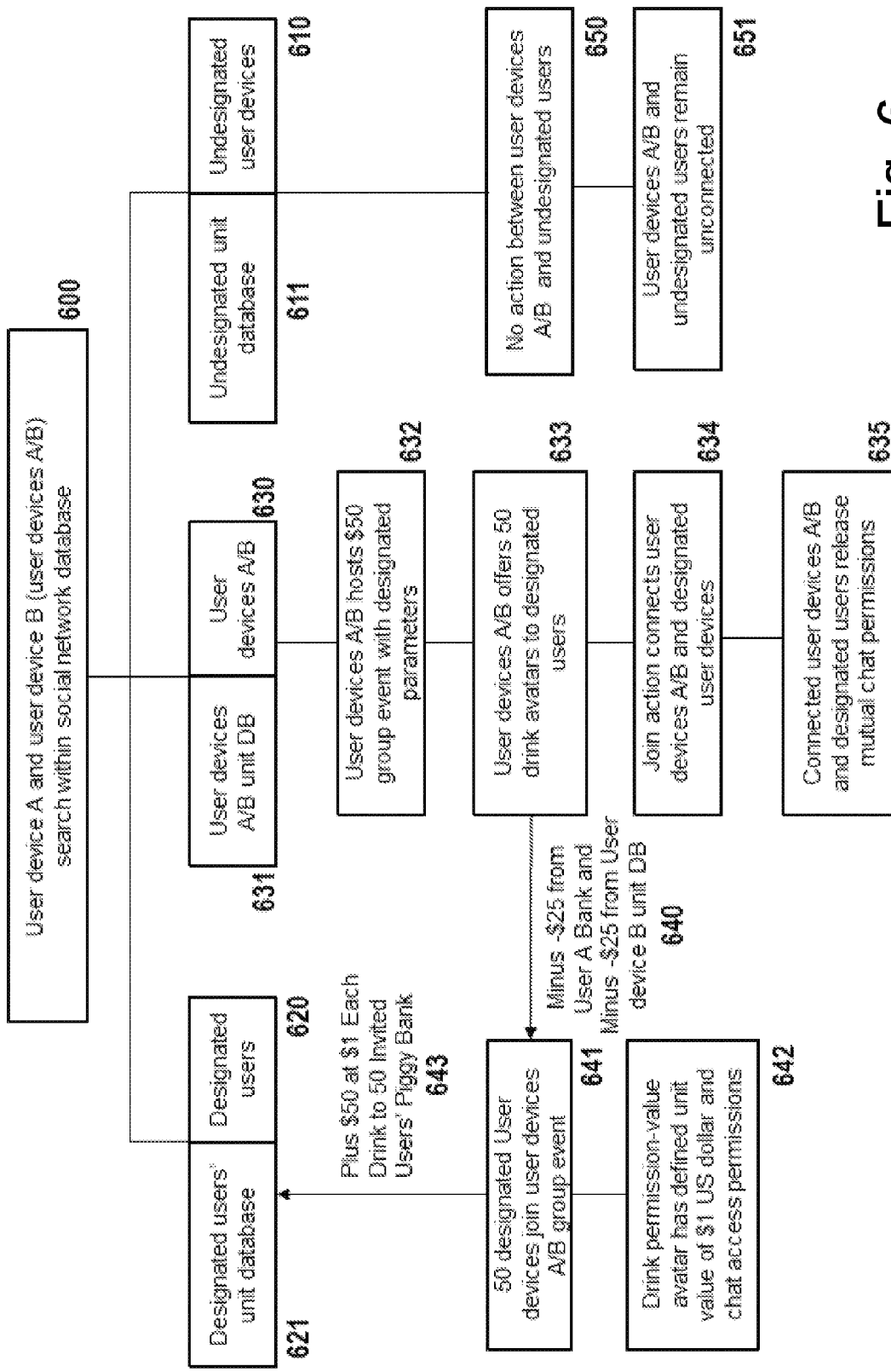
FIG. 6 is a flow diagram illustrating an exemplary embodiment of a content access management method in a group application on a social network, according to a preferred embodiment of the invention.

FIG. 6 is a flow diagram illustrating an exemplary embodiment of a content access management method in a group application on a social network, according to a preferred embodiment of the invention. According to the embodiment, two user devices 33 join to form a group with, for example, a user device A joining another user device B, (collectively, hereinafter referred to as user devices A/B, in step 630) with user device A having an associated user device A unit database 114 and user device B having an associated user device B unit database 114 in step 631, and performing a search within the social network, in step 600, for a user device group of designated preference. According to the embodiment, user devices A/B, may elect to establish an online group event within social network system 100 with designated parameters set to designate/invite members for a group event, in step 632. For example, user devices A/B may search for networking opportunities with other registered user devices in social media system 100 (for example, user profiles 300 associated to users in a same industry as user devices A/B), having a certain keyword in their associated user profiles 300, are part of a baseball team, seek to meet new users within a certain locality sharing their interest, seek to meet members of the opposite sex within a certain age group and within a certain local proximity, or, for example, to look for other user profiles 300 associated to a nation where the users, associated to the user devices A/B, may plan to visit in the foreseeable future, for example, for the purposes of obtaining travel advice. To incentivize other user devices 33 to join the group event, user devices A/B may offer a permission-value avatar in the form of a drink representation with, for example, a pre-specified amount (or value) of units (for example, one unit with a 1 United States dollar value) and permissions designating mutual chat permissions to user devices meeting their search parameters and electing to join their group event 633.

In this regard, a group event may be generated within social network system 100 viewable by all connected user devices 33 (connected via network 31), members with established profiles 300 of social network system 100, by a segmented group (or subset) of user devices 33. User profiles 300 not meeting the designated search preferences of user devices A/B may not, for example, may view the group event or may, for example, view the group event and not be allowed to establish an affirmative connection status because, for example, these undesignated user profiles 300 would not fit the designated preferences set by user devices A/B in step 610. In this regard, any unit value offered by user devices A/B may not be applicable to the undesignated users 611. No action would be initiated between user devices A/B and user devices 33 associated to the undesignated set of user profiles within social network system 100 in step 650. User devices A/B and user devices 33 associated to the undesignated set of user profiles would remain in the default unconnected state 651.

Conversely, user devices meeting the designated search preferences of user devices A/B, as defined in step 620, may view the group event established by user devices A/B and may be provided an option to join the group event by accepting the permission-value avatar (for example, in drink form) with the incentive of a number of units corresponding to a value of 1 United States dollar value, and mutual chat release permissions 642. In this example, user devices A/B may, for example, set a 50 drink avatar limit for their group event at a unit amount corresponding to, for example, 1 US dollar value per drink avatar and up to, for example, 50 user devices of designated preference within social network system 100 may elect to accept the drink avatar and join the group event. In this regard, whereby 50 user devices join the group event, in step 641, a unit value corresponding to a value of 25 United States dollar amount (or equivalent) may be subtracted from the associated unit databases of user device A and user device B respectively for a unit amount corresponding to a value of a total of 50 US dollars, in step 640, with a combined 50 US dollars, in step 643, added to the unit databases of the designated user devices, in step 621, at a unit amount corresponding to a value of, for example, 1 per drink avatar. Upon a designated user device accepting the drink avatar from user devices A/B, chat access permissions may, for example, be mutually released.

In some embodiments a private event may be generated by, at least, first user device 33 within social network system 100 viewable by, at least a portion of, connected user devices 33 (connected via network 31), at least a portion of members with established profiles 300 of social network system 100, or by a pre-defined segmented group (or subset) of user devices 33, or a combination thereof. User profiles 300 not meeting a designated view permission, or not pre-defined as, for example, "invited" by first user device 33, may not view the private event or may, for example, view the private event and not be allowed to establish an affirmative connection. In this regard, a user device 33 that may view the private event (or have knowledge of the private event through some other means) may offer a unit value to at least first user device 33, in exchange, for example, an "invitation" to the private event. A similar unit, content, and permission exchange may then ensue as described previously.

In another embodiment, user devices A/B may set, for example, a minimum or maximum avatar pool and upon a pre-specified amount of designated user devices electing to join user devices A/B group event surpass the quantity of available avatars offered, user devices A/B may be enabled to select among a plurality of designated user devices 33, or have, for example, a unit amount (for example corresponding to the maximum 50 US dollar) avatar pool limit split among all joining user devices 33 of designated preference. User devices A/B may also further segment in requiring designated user devices to perform one or more engagement actions to establish a minimal level of engagement such as enter, for example, a group chat room within the social network or initiate a chat as a prerequisite for accepting the permission-value avatar 632.

Figure 7:
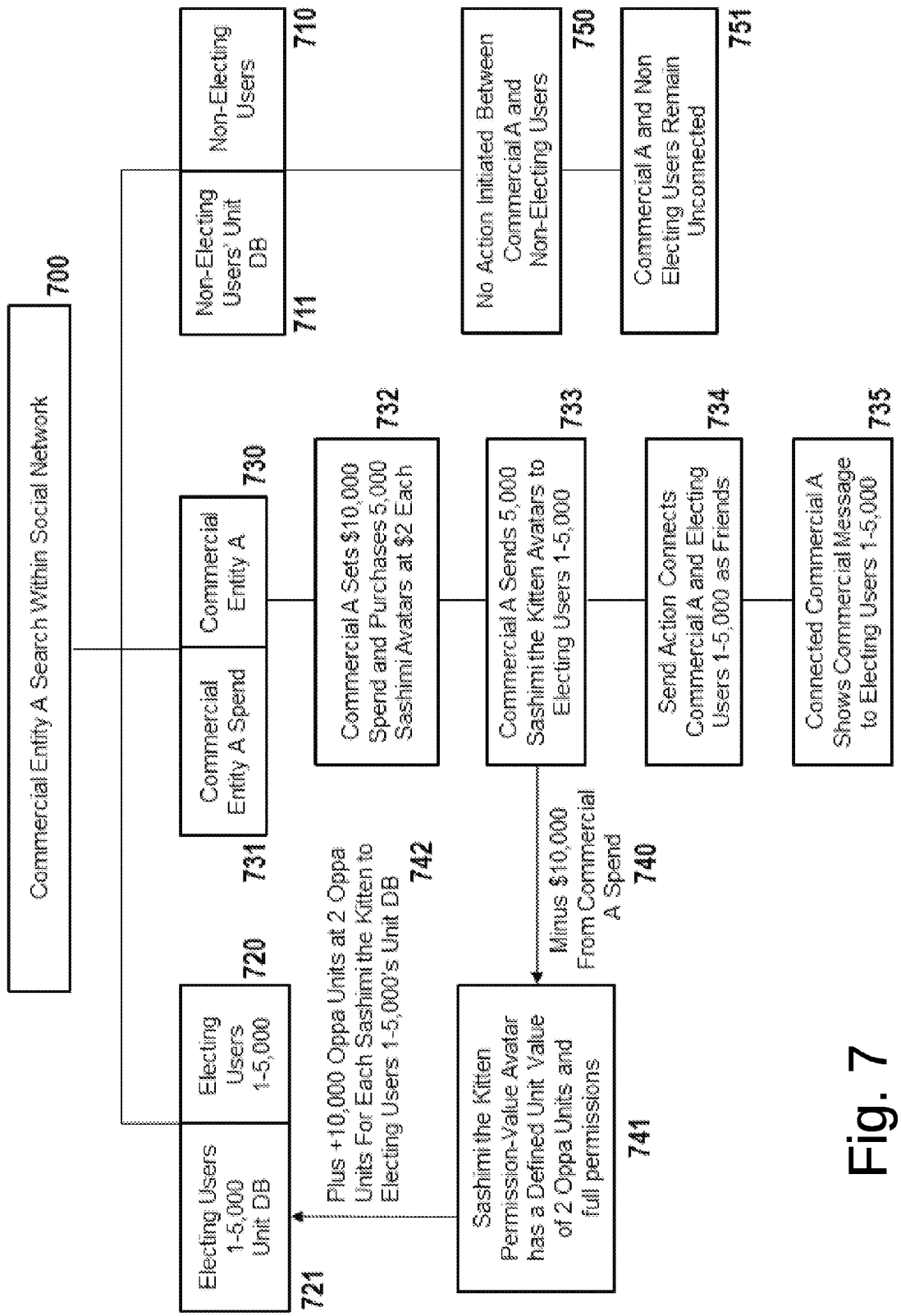
FIG. 7 is a flow diagram illustrating an exemplary embodiment of a content access management method in a commercial application on a social, according to a preferred embodiment of the invention.

FIG. 7 is a flow diagram illustrating an exemplary embodiment of a content access management method in a commercial application on a social network, according to a preferred embodiment of the invention. According to the embodiment, social network system 100 may be connected to social network provider 130 to execute at least a portion of the functionality. According to the embodiment, commercial entity user device 33 may, for example, align their interest with user devices 33 by sending permission-value avatars to engage with multiple targeted user device recipients 33 of whose associated profiles 300 may indicate designated preference. Instead of, for example, forcing automatic consumption of commercial content within social network system 100, a reward based methodology may allow highly engaged user devices 33 an opportunity to voluntarily elect in, for example, consuming commercial content (for example, promotional videos, images, surveys, and the like) in receiving the unit value component of the permission-value avatar in exchange for the content-access permissions component, effectively providing for a highly unique goodwill generating an incentive-aligned content system useful to both user devices 33 and commercial entity devices 33 within a social network.

According to the embodiment, in step 730, a commercial or organizational entity device A may, for example, designate a total commercial spend amount 731 and may perform a search within social network system 100 for a user device group of designated preference 700. In this regard, commercial entity device A may set, for example, a defined amount of units total available as a goodwill branding campaign (or virtual currency value equivalent, or standard currency equivalent, for example, an amount valued at 10,000 United States dollars) within social network system 100 (or distributed through social network provider 130) to promote, for example, an event (for example, a new movie) by seeking user devices 33 to engage, for example, via an image button, to play a 30-second preview video format trailer of the movie, for example Sashimi the Traveling Kitten 732. In some embodiments, commercial entity device A may seek to, for example, advertise a product or service, seek to engage with existing customers (associated to social media system 100) over a long-term time period for an existing or future product or service, request information on one or more user profiles (for example, aggregated information), one or more user devices participation or volunteers, target a specific user device group whereby the associated profiles designate, for example, a certain gender, demographic, age group, nationality, proximity, or the like, for commercial or organizational purposes, in step 735. In this regard, commercial entity device A may acquire, from social network system 100, a quantity of, for example, 5000 Sashimi Kitten avatars at a particular unit amount (for example, units corresponding to a value of 2 United States dollars each) in step 732, with each Sashimi Kitten avatar having a defined unit value of, for example, 2 oppa units and full content, communication, and engagement permissions release 741. According to the embodiment, each unit may represent a set exchange value of, for example, one United States dollar, one oppa unit, or other set or adjustable exchange value between real or virtual currency as determined by unit exchange module 118.

According to the embodiment, a commercial advertisement may be generated within social network system 100 and may be viewable to all connected user devices 33, registered user devices 33 of social network system 100, or by a segmented group or subset of target user devices 33, and social media provider 130 user devices. For example, the Sashimi the Traveling Kitten movie may be targeted to user devices 33 associated to user profiles 300 of users aged 25-40 with families and young children. User devices 33 with user profiles 300 not meeting the designated search preferences of commercial entity device A may not, for example, be requested to display unnecessary commercial content, for example, where the associated user device 33 may have little interest. Avatars may not be offered to the non-electing user devices 33 in step 710, and as such, no action would be initiated between commercial entity device A and the non-electing user devices 33 within social network system 100 and in step 750, commercial entity device A and the non-electing set of user devices 33 may remain in a default unconnected state 751 as configured by access limitation module 109.

In order to entice one or more targeted user devices 33 to engage the 30-second video, user profiles 300 meeting the designated search preference of commercial entity device A may, for example, be provided an option to display the promotional video of commercial entity device A by engagement of a, for example, "view video button". Electing user devices 33 in step 720 after having displayed the promotional video in step 735 may be sent, for example, a Sashimi avatar from commercial entity device A at, for example, 2 virtual oppa units to associated unit databases of electing user devices 33 in step 721, up to, for example, a maximum 5000 user devices that may have played the promotional video in step 742. According to the embodiment, commercial entity device A may desire to make available, a predefined maximum number of units (for example, units corresponding to a maximum value of 10,000 US dollars) in step 740, to promote, for example, a commercial message by sharing, for example, 5000 Sashimi avatars to up to 5000 electing user devices 33 within social network system 100 in step 720. In step 741, content access module 106 may establish a connected state in step 734 to commercial entity device A for the one or more user devices 33 that played the promotional video, for example, with mutual content, communication, and engagement permissions fully released.

In some embodiments, commercial entity device A may also set a minimum or maximum avatar pool and should the amount of designated user devices 33 electing to play commercial entity device A's video surpass the quantity of available avatars offered, commercial entity device A may be offered indicia to select among the electing user profiles, or pool the commercial units to be split among all electing user devices 33 of designated preference. Commercial entity device A may also further segment in requiring designated user devices 33 to perform one or more engagement actions in establishing a minimal level of engagement as a prerequisite for accepting a permission-value avatar in step 735.

In some embodiments, whereby content access module 106 establishes an affirmative full permissions connection status with electing user devices 33, commercial entity device A may continue to, for example, generate additional commercial content (for example, a movie sequel) within social network system 100 and have such additional content playable on now-connected user devices 33 at, for example, no additional cost among a user device group of engaged and opted-in user devices 33 in step 735. Furthermore, commercial entity device A may be provided with useful data (for example analytics or metric data, or both) about the user device group of electing user devices 33 to increase conversion rates for future advertising efforts in step 735. As the user device group of electing user devices 33 may have received an up-front benefit in consuming such commercial content, the user device group of electing user devices 33 may be, for example, more willing to consume, engage with, or prioritize future content from commercial entity device A over other content.

Figure 8:
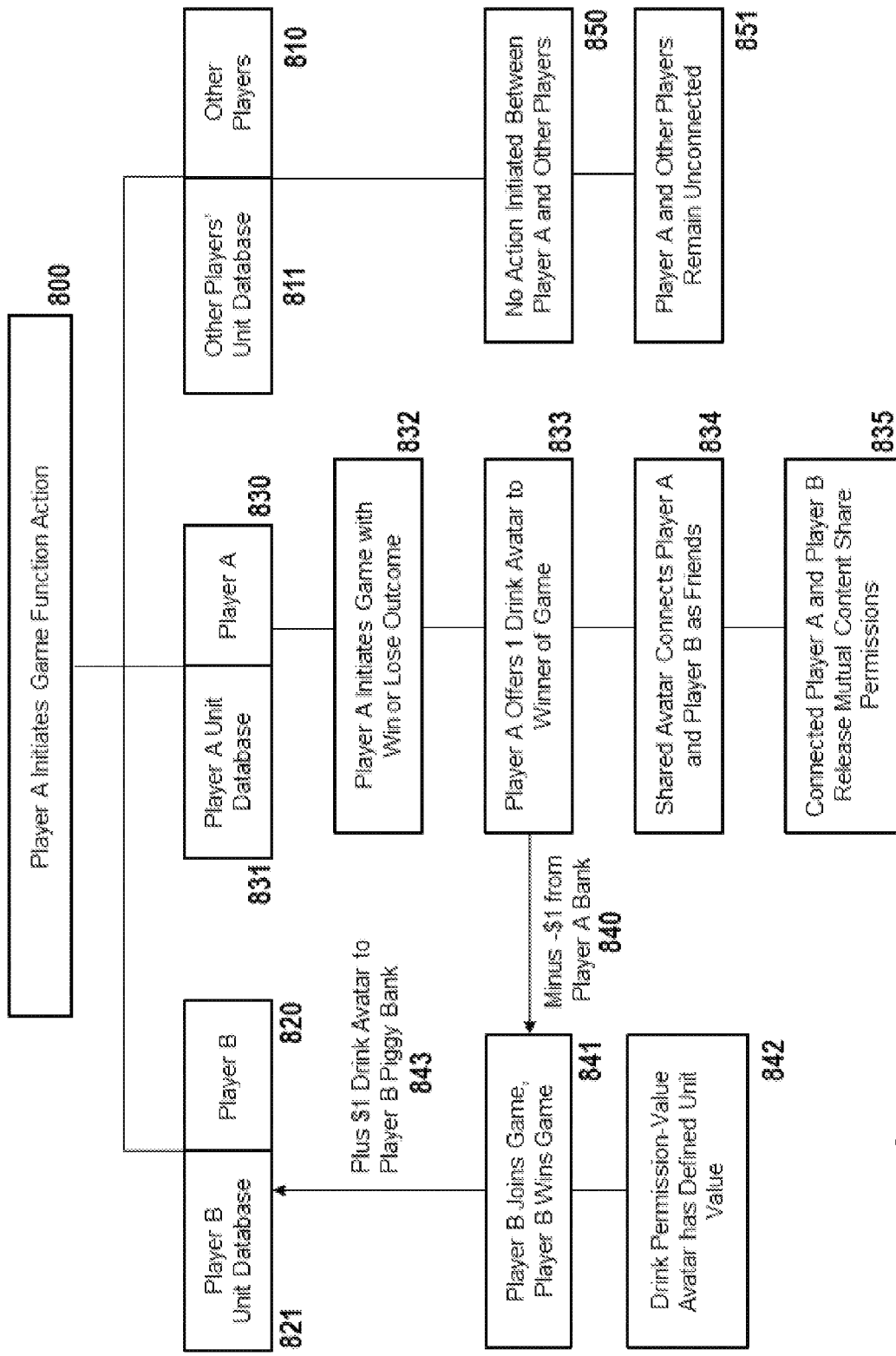
FIG. 8 is a flow diagram illustrating an exemplary embodiment of a content access management method in a game application on a social network, according to a preferred embodiment of the invention.

FIG. 8 is a flow diagram illustrating an exemplary embodiment of a content access management method in a game application on a social network, according to a preferred embodiment of the invention. According to the embodiment, social network system 100 (and, in some embodiments, social network provider 130) may be configured to provide a reward based engagement arrangement between a plurality of user devices 33 over a long term by providing a reward-based methodology for encouraging user devices 33 to remain active, repetitive, and consistent in interactions with other user devices 33.

According to the embodiment, in step 800, user device 33 player A (having registered to social network system 100 in step 830) may seek to play a game against another user device 33 player and may initiate a search for an opposing user device 33 player with one or more designated preferences. A first unit database 114 is associated to user device 33 player A in step 831. A second unit database 114 is associated to user device 33 player B in step 821. Further according to the embodiment, in step 832, the game is configured by game module 108 (for example, a turn based or a simple engagement game such as rock-paper-scissors, with one winner and one loser, and the like). In this regard, in step 833, a winner of the game may be offered an option to transfer an amount of units (for example, where the amount corresponds to $1 United States dollar) associated to a drink themed avatar tied to mutual content share permissions to the loser of the game. As this is an optional avatar transfer scenario, user devices 33 Player A and B may be assigned an honor score representing the percentage or general likeliness of the losing player device to honor the transfer of a permission-value avatar to the winning player device 33. If, for example, the game involves a certain level of skill, player devices 33 within the game may be assigned a certain player level or experience score representing the player's skill level, likelihood to win, win percentage, etc.

Accordingly, user device 33 player A may initiate a game within social network system 100 whereby opposing player devices 33 may join or seek opposing player devices 33 within a segmented group of user profiles with designated preference. For example, user device 33 player A may seek to initiate a game against opposing player devices 33 defined as a subset of player devices 33 (for example, whereby identifying player devices 33 associated to profiles 300 of users within a limited friendship circle, target particular users in an invite-only game, set age, gender, and proximity preferences in initiating a game for dating purposes, seek opposing players of a certain skill or experience level for a challenge, seek opposing players with a high honor score for financial gain and the chance of building the user's unit database, or the like). Other user devices 33 (that may have registered to social network system 100 in step 810 and having unit databases 114 associated in step 811) not meeting the designated search preferences of user device 33 player A may not be allowed to participate against user device 33 player A. In step 850 any unit amounts offered through a permission-value avatar by user device 33 player A may not be applicable to other player devices 33 and their respective unit databases 114. For example, no action may be initiated between user device 33 player A and the undesignated set of other user devices 33 within social network system 100. As such, in step 851, user device 33 player A and the undesignated set of other user devices 33 would remain in the default unconnected state 851, as configured by access limitation module 109.

User devices 33 associated to user profiles 300 meeting the designated search preferences of user device 33 player A, may view the game event initiated by user device 33 player A in which user device 33 player A suggests, for example, that the loser of the game share a specific amount of units, for example an amount of units corresponding to a value of 1 US dollar drink avatar tied to mutual content share permissions to the winner of the game 842. User device 33 player B (i.e. the challenging user device) within a designated group (that is, a group of user devices 33 whose associated profiles 300 met the designated search criteria) may elect to join the game. In step 841, in a scenario whereby user device 33 player B joins the game and wins the game (and user device 33 player A loses the game), losing user device 33 player A, may elect to send a permission-value avatar (for example, avatar with a unit value corresponding to 1 US dollar value). Accordingly, in step 840, a corresponding amount of units are subtracted from first unit database 114 associated to user device 33 player A. In step 843, the units are added to second unit database 114 associated to user device 33 player B as a reward for winning the game. In step 834, the avatar connects user device 33 player A and B and in step 835 mutual content access and engagement level permissions are released between the two player devices as defined by content access module 106.

In some embodiments, in an incentivized bid for other user devices 33 within the social network system 100 to engage with one another, social network system 100 or user devices 33 may set a group game or challenge in seeking to concurrently engage with multiple user devices of designated preference or set a guarantee of avatar transfer to a winning player upon the event of an opposing player losing the game. In other embodiments, social network system 100 or user devices 33 may, for example, set variable degrees of win-loss, set the time order of the avatar transfer (pre-game versus post-game), limit the availability of user devices 33 to access the game, or set optional versus mandatory avatar transfer conditions. For example, to facilitate desirable and repetitive interaction within social network system 100, and social network provider 130, social network provider 130 may make such a game option available in a time-limited fashion (for example, once daily), reward highly engaged user devices 33 with a guaranteed reward and an option to play against an entity created by social network provider 130, or limit user devices having a low honor score. Such actions may also seek to sustain user engagement levels within social network system 100 (or connected social network provider 130), to encourage user devices 33 to communicate and engage with other user devices 33, and assist in combating social network concept and novelty fatigue.

Figure 9:
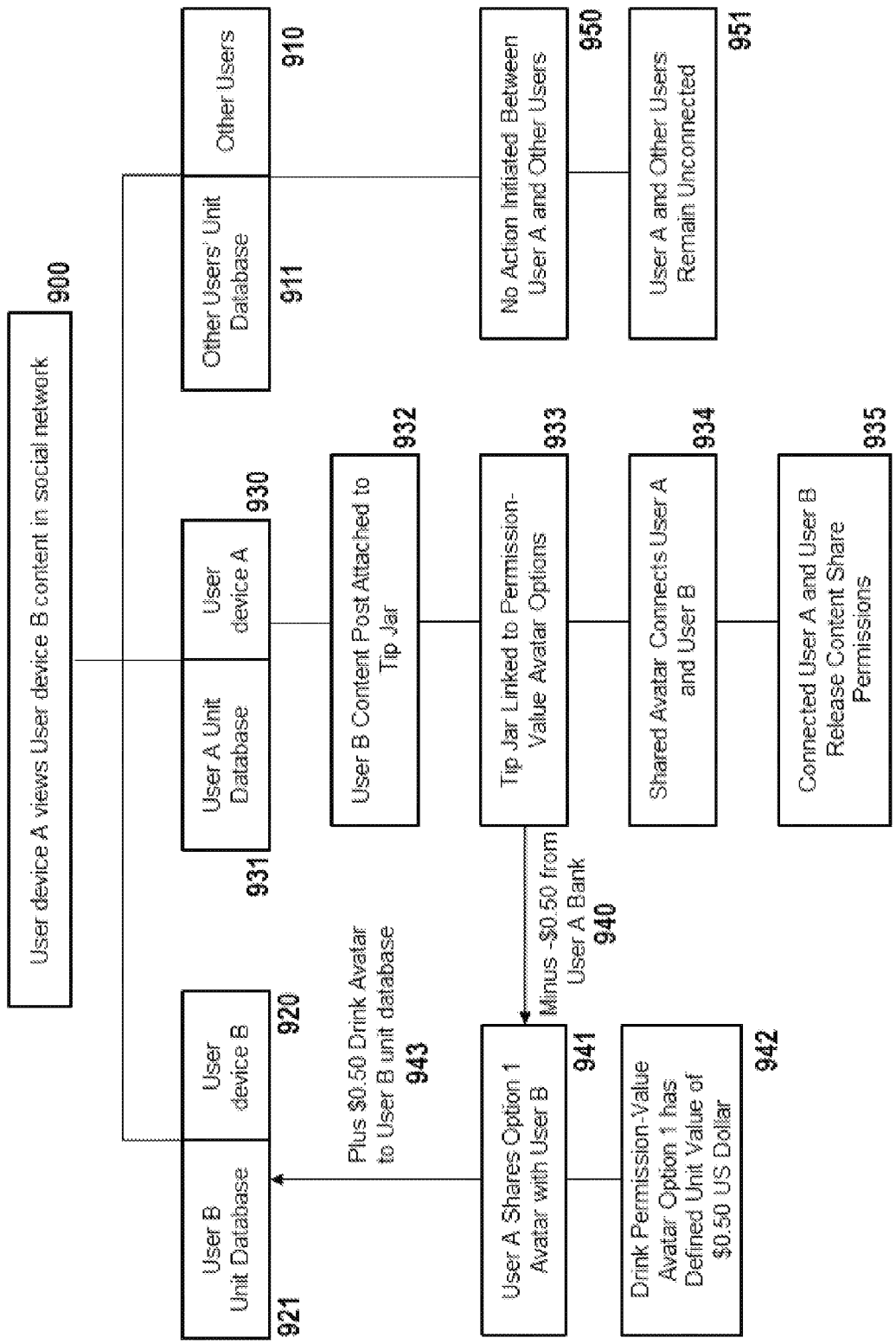
FIG. 9 is a flow diagram illustrating an exemplary embodiment of a content access management method in a gratuity delivery application on a social network, according to a preferred embodiment of the invention.

FIG. 9 is a flow diagram illustrating an exemplary embodiment of a content access management method in a gratuity delivery application on a social network, according to a preferred embodiment of the invention. According to the embodiment, social network system 100 (and, in some embodiments, social network provider 130, or as a component of social network provider 130) may be configured to provide a gratuity-based engagement arrangement for a plurality of user devices 33 to enable, for example, a unit amount associated to a permission-value avatar transferred by a first user device 33 to, at least, a second user device 33, for example, in gratitude for services rendered by, at least, second user device 33.

According to the embodiment, in step 900, first user device 33 connected to social network system 100 may seek to transfer a unit amount associated to a permission-value avatar to second user device 33, also connected to social network system 100. First user device 33 may view social media content information (for example, a social media post, an image, a video, a crowdfunding request, end the like) associated to second user device 33, for example, a blog post outlining a procedure for building, for example, a suspension shelf, the blog post associated to second user device 33. In step 931, a first unit database 114 is associated to first user device 33, with the first user device 33 having registered to social media system 100 in step 930. In step 921, a second unit database 114 is associated to second user device 33, with the second user device 33 having registered to social media system 100 in step 920.

According to the embodiment, first user device 33 desires to transfer a unit amount associated to a permission-value avatar to second user device 33 in exchange for content (for example, the blog post outlining a procedure for building a suspension shelf) associated to second user device 33. It should be appreciated that a blog post may have been provided free of charge by a user of second user device 33 and a considerable amount of effort may have been put in providing a satisfying level of accuracy in the instructive dialog. In this regard, a user of first user device 33 may be gratuitous for having valuable information free-of-charge. As such, in step 932, second user device 33 attached indicia outlining acceptance of gratuity (hereinafter, referred to as "tip jar"). According to the embodiment, the tip jar is associated to the content access management system 110 thereby enabling permission-value avatar functionality including, at least, unit transfers, permission-sharing, and other options.

According to the embodiment, first user device 33 may identify a receiving tip jar of a unit amount associated to a permission-value avatar designated as gratuity, for example, the tip jar associated to second user device 33. In some embodiments the tip jar is a unit database 114 associated to second user device 33. Other user devices 33 not associated to the receiving tip jar may not be allowed to receive a unit amount associated to a permission-value avatar, a unit amount associated to a permission-value avatar designated as gratuity in step 950, and any unit value offered through avatar form by first user device 33 may not be applicable to other user devices 33 having been registered to social network system 100 in step 910 having unit databases associated in step 911. For example, no action may be initiated between first user device 33 and other user devices 950 and first user device 33 and other user devices 33 would remain in a default unconnected state 951, as configured by access limitation module 109.

Further according to the embodiment, first user device 33 having identified second user device 33 as the receiver of gratuity, identifies an amount of units associated to a permission-value avatar in step 942, for example, a unit amount associated to the permission-value avatar corresponds to a value of 0.5 US dollar drink avatar tied to mutual content-share permissions. First user device 33 initiates a transfer of the permission-value avatar to second user device 33 in step 941, if accepted by second user device 33, the units are subtracted from first unit database 114 (associated to first user device 33) and added to second unit database 114 (associated to second user device 33) in step 943. In a next step 934, content access and engagement level permissions between first and second user devices 33 are released by content access module 106 in step 935.

In some embodiments, an auto-accept function may be configured for a recipient user profile 300 (associated to a user device 33). In this regard, upon the receipt of a permission-value avatar, a recipient user device may receive an associated unit value or content, or permissions (or a combination thereof) without user intervention. In other embodiments, a multilayered configuration of permissions may be associated to different forms of content. For example, a particular permission value avatar may be required for introductory content, and then for subsequent or more complex content, a different avatar may be required, for example, to view an entire profile, and the like.

The skilled person will be aware of a range of possible modifications of the various embodiments described above.
Hardware Architecture Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 10:
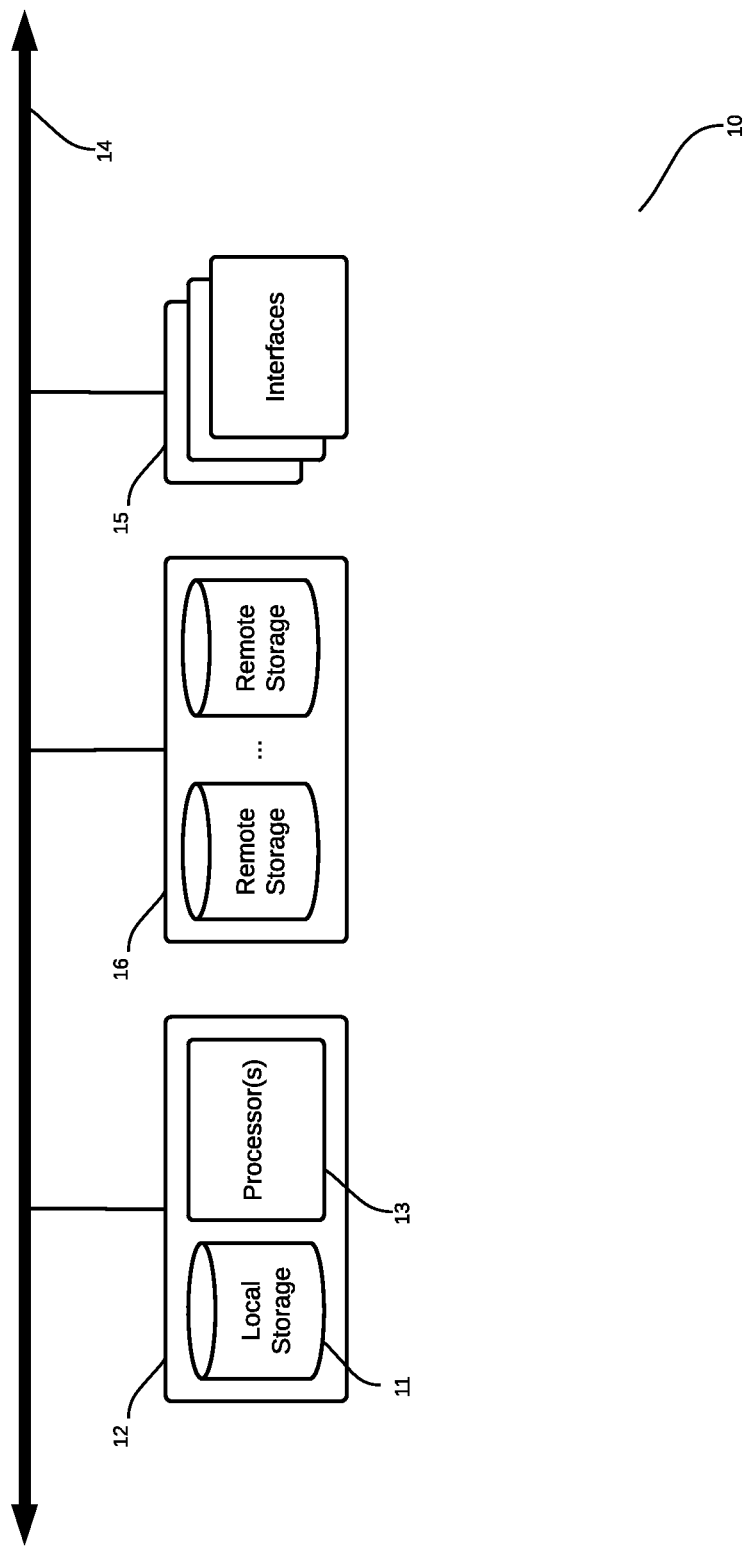
FIG. 10 is a block diagram illustrating an exemplary hardware architecture of a computing device used in an embodiment of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
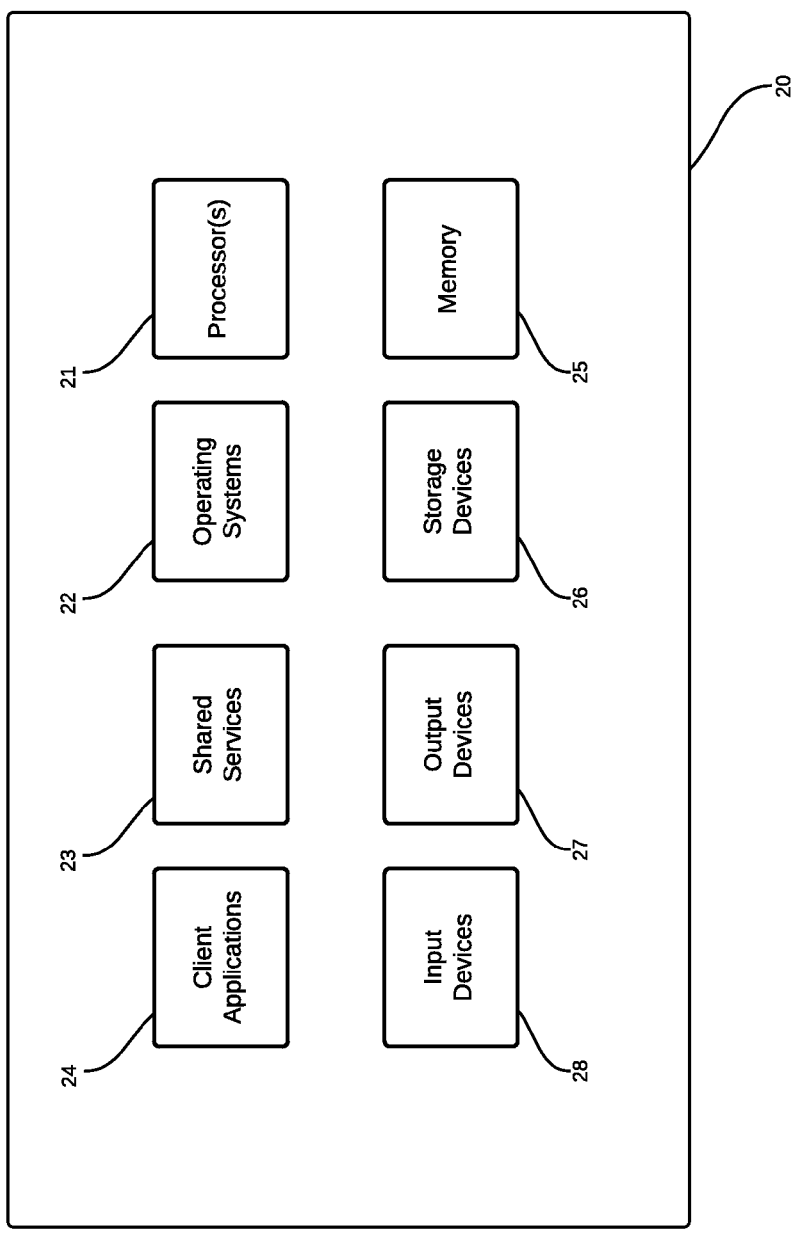
FIG. 11 is a block diagram illustrating an exemplary logical architecture for a client device, according to an embodiment of the invention.

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more user devices, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 12:
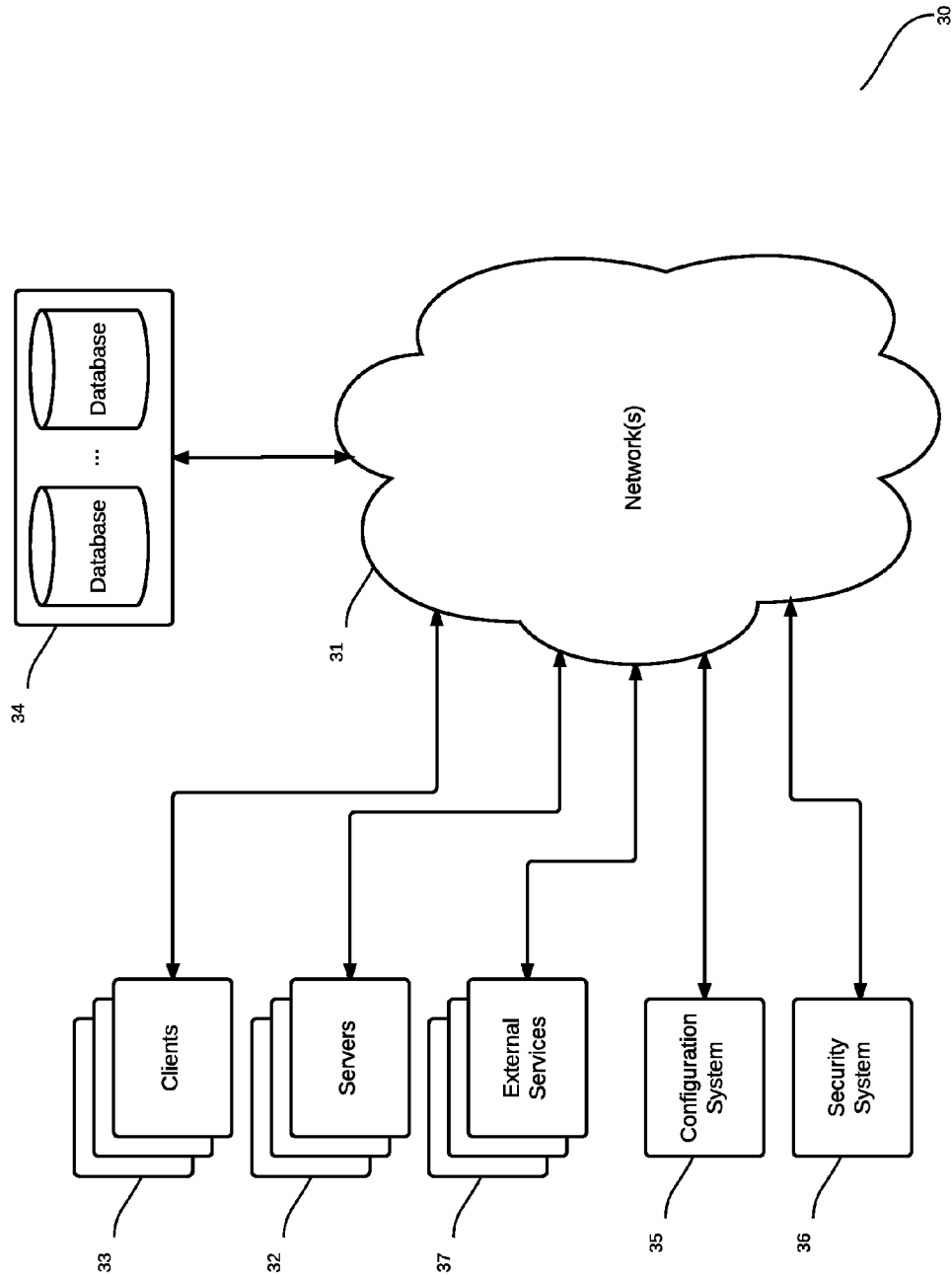
FIG. 12 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 12, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 13:
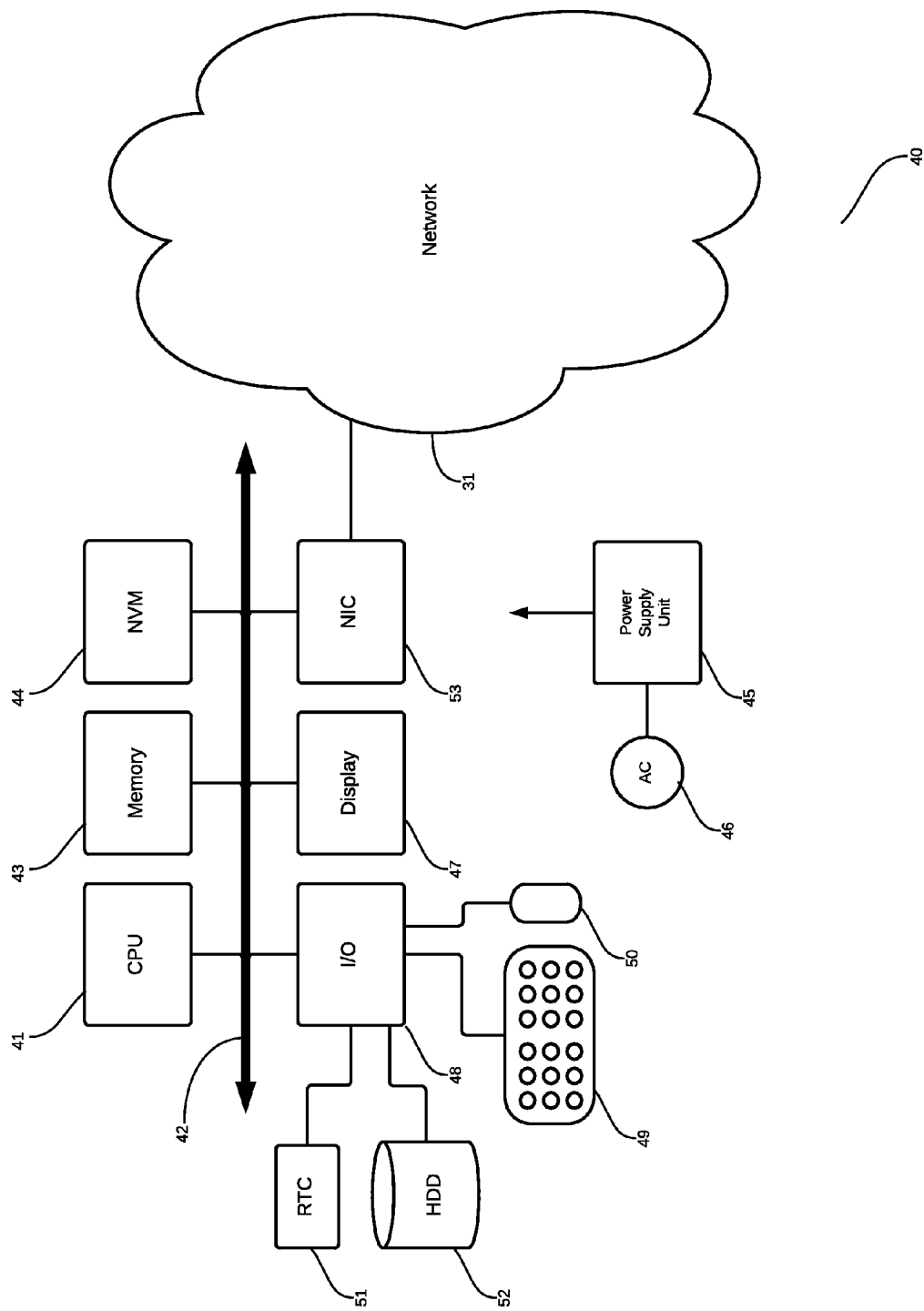
FIG. 13 is a block diagram illustrating an exemplary hardware architecture of a computing device used in various embodiments of the invention.

FIG. 13 shows an exemplary overview of a computer system 40 as may be used in any of the various locations throughout the system. It is exemplary of any computer that may execute code to process data. Various modifications and changes may be made to computer system 40 without departing from the broader spirit and scope of the system and method disclosed herein. CPU 41 is connected to bus 42, to which bus is also connected memory 43, nonvolatile memory 44, display 47, I/O unit 48, and network interface card (NIC) 53. I/O unit 48 may, typically, be connected to keyboard 49, pointing device 50, hard disk 52, and real-time clock 51. NIC 53 connects to network 31, which may be the Internet or a local network, which local network may or may not have connections to the Internet. Also shown as part of system 40 is power supply unit 45 connected, in this example, to ac supply 46. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for managing content access for a plurality of user devices comprising:
    a network-connected content access management server comprising a memory and a processor and further comprising programmable instructions stored in the memory and operating on the processor, the instructions when executed by the processor, cause the processor to manage content access for a plurality of network-connected user devices comprising:
    a plurality of connections from the plurality of user devices;
    a plurality of user profiles, each profile associated to a user device of the plurality of user devices;
    a plurality of unit counters, each unit counter associated to a user profile of the plurality of use profiles;
    a transfer module;
    an access limitation module;
    a connection module;
    an avatar theme module;
    an engagement module;
    unit redemption module;
    unit creation module;
    a plurality of permission-value avatars, each permission-value avatar comprising:
        a thematic identifier;
        a plurality of content-share permissions;
        a plurality of units;
    a plurality of content;
    wherein the access limitation module defines default access rights for the plurality of content, the default access rights defining accessibility of the plurality of content by the plurality of user devices;
    wherein the avatar theme module defines a graphic communication element for each permission-value avatar, the graphic communication element associated to a thematic identifier of each permission-value avatar;
    wherein the connection module:
        receives a plurality of search preferences from a first user device;
        identifies a user device group of designated preference based on the plurality of the search preferences, the user device group comprising at least one other user device of the plurality of user devices; and
        receives a first permission-value avatar from the first user device comprising:
            a selected thematic identifier;
            one or more sets of content-share permissions, each set of content share permissions corresponding to at least a portion of user devices of the user device group;
            a plurality of units;
    wherein the transfer module receives a request from the first user device to transfer the first permission-value avatar to a second user device, the second user device belonging to the user device group;
    wherein the transfer module transfers the first permission-value avatar to the second user device;
    wherein upon the connection module receiving an acceptance of the first permission-value avatar from the second user device, a plurality of content-share permissions, associated to the first permission-value avatar and the plurality of units assigned to the permission-value avatar are transferred concurrently, by the transfer module, from the first user device to the second user device;

wherein the access limitation module, associates the plurality of content-share permissions to the first permission-value avatar defining at least a portion of the plurality of content accessible by the first user device and the second user device;

wherein the engagement module designates at least a mutual chat permission for the first user device and the second user device, the mutual chat permission enabling chat communication between the first user device and the second user device;

wherein a unit amount is subtracted, by the unit redemption module from a first unit counter associated to a first user profile corresponding to the first user device, the unit amount defined by a plurality of units associated to the first permission-value avatar;

wherein the unit amount is added, by the unit creation module, to a second unit counter associated to a second user profile corresponding to the second user device.

2. The system of claim 1, wherein, the connection module receives a notification of a rejection, instead of an acceptance, of the first permission-value avatar from the second user device, the plurality of content accessible by the first user device and the second user device is maintained at a default state.

3. The system of claim 2, further comprising:
a social network system;
wherein the social network system manages the plurality of content received from the plurality of user devices;
wherein access to view at least a portion of the plurality of content by the plurality of user devices is defined by the plurality of content-share permissions associated to the user device from which the associated at least portion of content of the plurality of content was received.

4. The system of claim 3, wherein access to view at least a portion of the first user profile by the plurality of user devices is defined by the plurality of content-share permissions associated to the first user profile.

5. The system of claim 4, further comprising:
a content access module;
wherein the content access module shares at least a portion of the plurality of content between the first user device and the second user device based on the plurality of content-share permissions associated to the first user profile corresponding to the first user device.

6. The system of claim 1, wherein a category of the graphic communication element is selected from the group consisting of item-based, action-based and culture-based.

7. The system of claim 1, wherein the plurality of units corresponds to an amount of a medium of currency.

8. The system of claim 7, wherein the medium of currency is selected from the group consisting of dollar, euro, yen, peso, pound, yuan, rupee, ruble, bitcoin, and a virtual currency.

9. A method for managing content access for a plurality of user devices comprising:
deploying a network-connected content access management server comprising a memory and a processor and further comprising programmable instructions stored in the memory and operating on the processor, the instructions when executed by the processor, cause the processor to manage content access for a plurality of network-connected user devices comprising the steps of:

receiving a plurality of connections from the plurality of user devices;
assigning a plurality of user profiles, each profile associated to a user device of the plurality of user devices;
assigning a plurality of unit counters, each unit counter associated to a user profile of the plurality of use profiles;
configuring a plurality of permission-value avatars, each permission-value avatar comprising:
a thematic identifier;
a plurality of content-share permissions;
a plurality of units;
receiving a plurality of content from the plurality of user devices;
setting, at an access limitation module, default access rights for the plurality of content, the default access rights defining accessibility of the plurality of content by the plurality of user devices;
defining, at an avatar theme module, a graphic communication element for each permission-value avatar, the graphic communication element identified associated to a thematic identifier of each permission-value avatar;
receiving, at a connection module, a plurality of search preferences from a first user device;
identifying, at the connection module, a user device group of designated preference based on the plurality of search preferences, the user device group comprising at least one other user device of the plurality of user devices;
receiving, at a connection module, a selection of a first permission-value avatar from the first user device comprising:
a selected thematic identifier;
one or more sets of content-share permissions, each set of content share permissions corresponding to at least a portion of user devices of the user device group;
a plurality of units;
receiving, at a transfer module, a request from the first user device to transfer the first permission-value avatar to a second user device, the second user device belonging to the user device group;
transferring, by the transfer module, the first permission-value avatar to the second user device;
upon receiving, at the connection module, an acceptance of the first permission-value avatar from the second user-device, transferring concurrently, by the transfer module, a plurality of content-share permissions, associated to the first permission-value avatar, and the plurality of units assigned to the permission-value avatar from the first user device to the second user device;
defining, by the access limitation module, at least a portion of the plurality of content accessible by the first user device and the second user device based on a the plurality of content-share permissions;
designating, at an engagement module, at least a mutual chat permission for the first user device and the second user device, the mutual chat permission enabling chat communication between the first user device and the second user device;
subtracting, by a unit redemption module, the plurality of units a unit amount from a first unit counter associated to a first user profile corresponding to the first user device, the unit amount defined by the selected plurality of units associated to the first permission-value avatar;

adding, by a unit creation module, unit amount to a second unit counter associated to a second user profile corresponding to the second user device.

10. The method of claim 9, further comprising the step of:

receiving, at the connection module, instead of an acceptance of the first permission-value avatar from the second user-device, a notification of a rejection of the first permission-value avatar, from the second user device;

maintaining, at the access limitation module, default access rights for at least a portion of the plurality of content, the default access rights defining accessibility of the plurality of content by the first and second user devices.

11. The method of claim 10, further comprising the step of:

managing, at a social network, the plurality of content received from the plurality of user devices;

wherein access to view at least a portion of the plurality of content by the plurality of user devices is defined by the plurality of content-share permissions associated to the user device from which the content was received.

12. The method of claim 11, wherein access to view at least a portion of the first user profile by the plurality of user devices is defined by the plurality of content-share permissions associated to the first user profile.

13. The method of claim 12, further comprising the step of:

sharing, at a content access module, at least a portion of the plurality of content between the first user device and the second user device based on the plurality of content-share permissions associated to the first user profile corresponding to the first user device.

14. The method of claim 9, wherein a category of the graphic communication element is selected from the group consisting of item-based, action-based and culture-based.

15. The method of claim 9, wherein the plurality of units corresponds to an amount of a medium of currency.

16. The method of claim 15, wherein the medium of currency is selected from the group consisting of dollar, euro, yen, peso, pound, yuan, rupee, ruble, bitcoin, and a virtual currency.

* * * * *